(12) United States Patent
Rhee et al.

(10) Patent No.: US 7,827,559 B1
(45) Date of Patent: Nov. 2, 2010

(54) FRAMEWORK FOR EXECUTING MULTIPLE THREADS AND SHARING RESOURCES IN A MULTITHREADED COMPUTER PROGRAMMING ENVIRONMENT

(75) Inventors: Stephen Jisoo Rhee, Mountain View, CA (US); Elaine Yee Ting Sin, Sunnyvale, CA (US); Gerardo Pardo-Castellote, Palo Alto, CA (US); Stefaan Sonck Thiebaut, Berlin (DE); Rajive Joshi, San Jose, CA (US)

(73) Assignee: Real-Time Innovations, Inc., Santa Clara, CA (US)

( * ) Notice: Subject to any disclaimer, the term of this patent is extended or adjusted under 35 U.S.C. 154(b) by 1212 days.

(21) Appl. No.: 11/410,563

(22) Filed: Apr. 24, 2006

(51) Int. Cl.
*G06F 9/455* (2006.01)
*G06F 9/46* (2006.01)

(52) U.S. Cl. ........................... 718/104; 718/102

(58) Field of Classification Search ................ 718/102, 718/104
See application file for complete search history.

(56) References Cited

U.S. PATENT DOCUMENTS

| | | | |
|---|---|---|---|
| 4,484,294 A | 11/1984 | Noss | |
| 4,568,866 A | 2/1986 | Floro et al. | |
| 4,796,179 A | 1/1989 | Lehman et al. | |
| 5,055,755 A | 10/1991 | Ozawa et al. | |
| 5,086,385 A | 2/1992 | Launey et al. | |
| 5,404,288 A | 4/1995 | McDunn | |
| 5,546,301 A | 8/1996 | Agrawal et al. | |
| 5,838,563 A | 11/1998 | Dove et al. | |
| 5,940,827 A | 8/1999 | Hapner et al. | |
| 5,971,581 A | 10/1999 | Gretta et al. | |
| 6,026,352 A | 2/2000 | Burns et al. | |
| 6,058,445 A | 5/2000 | Chari et al. | |
| 6,076,952 A | 6/2000 | Gretta et al. | |
| 6,106,569 A | 8/2000 | Bohrer et al. | |
| 6,119,125 A | 9/2000 | Gloudeman et al. | |
| 6,134,706 A | 10/2000 | Carey et al. | |
| 6,154,680 A | 11/2000 | White et al. | |
| 6,195,591 B1 | 2/2001 | Nixon et al. | |
| 6,226,788 B1 | 5/2001 | Schoening et al. | |
| 6,226,792 B1 | 5/2001 | Goiffon et al. | |
| 6,259,958 B1 | 7/2001 | Steinman et al. | |
| 6,269,396 B1 | 7/2001 | Shah et al. | |

(Continued)

OTHER PUBLICATIONS

U.S. Appl. No. 11/379,986, filed Apr. 24, 2006.

(Continued)

*Primary Examiner*—Meng-Ai An
*Assistant Examiner*—Blake Kumabe
(74) *Attorney, Agent, or Firm*—Beyer Law Group LLP

(57) ABSTRACT

Techniques for execution of multiple threads in a multi-threaded computing programming environment are disclosed. The techniques are especially well suited for environments that use multilayered programming architecture where a higher layer can build on the functions provided by a lower layer where the delay time is an important consideration. In one aspect, the conceptual notion of a "Worker" effectively serves to represent the thread-specific execution context for a thread of execution ("thread") in a multithreaded computing environment. Another aspect, provides the notion of an Exclusion Area (EA) as logical lock that serves to protect shared resources in a multithreaded environment. The combination of the worker and EA are used to provide a powerful framework that, among other things, allows minimizing of the delay time.

13 Claims, 21 Drawing Sheets

U.S. PATENT DOCUMENTS

| | | |
|---|---|---|
| 6,425,119 B1 | 7/2002 | Jones et al. |
| 6,477,439 B1 | 11/2002 | Bernaden, III et al. |
| 6,493,740 B1 * | 12/2002 | Lomax ....................... 718/107 |
| 6,725,446 B1 | 4/2004 | Hahn et al. |
| 6,751,663 B1 | 6/2004 | Farrell et al. |
| 2004/0064553 A1 | 4/2004 | Kjellberg |

OTHER PUBLICATIONS

U.S. Appl. No. 11/410,511, filed Apr. 24, 2006.

Taylor, Object-Oriented Information Systems Planning and Implementation, pp. 1-172, 215-282, Apr. 10, 1992.

Rational Rose, Using Rational Rose 4.0, Rational Software Corporation, pp. 1-219, Nov. 1996.

Quatrani, Terry,Visual Modeling with Rational Rose and UML, pp. 1-6, Third Printing Apr. 1998.

Object Management Group (OMG), "Data Distribution Service for Real-Time Systems Specification," Version 1.1, Dec. 2005.

Case et al., A Simple Network Management Protocol (SNMP), May 1990, IETF, RFC 1157, pp. 2, 6-8, 10, 12, 16, 19-20, 25, 27.

McCloghrie et al., Management Information Base for Network Management of TCP/IP-based internets, Aug. 1988, IETF, RFC 1066, pp. 10-11.

Rose et al., Structure and Identification of Management Information for TCP/IP-based internets, Aug. 1988, IETF, RFC 1065, pp. 7-8, 10.

Information Sciences Institute, USC, Internet Protocol, Sep. 1981, IETF, RFC 791, pp. 11.

Postel, J., User Datagram Protocol, Aug. 28, 1980, IETF, RFC 768, pp. 1.

UML Booch & Omt, Quick Reference for Rational Rose 4.0, 1996, Rational Software Corporation, pp. 10.

Burnett et al., "Concepts and Environments—Visual Object-Oriented Programming", 1995, Manning Publications Co., pp. 276.

Firesmith et al., "Dictionary of Object Technology", Sigs Books, 1995, pp. 5.

* cited by examiner

FRAMEWORK FOR EXECUTING MULTIPLE THREADS AND SHARING RESOURCES IN A MULTITHREADED COMPUTER PROGRAMMING ENVIRONMENT

CROSS-REFERENCE TO RELATED APPLICATIONS

This application is related to co-pending and concurrently filed application Ser. No. 11/379,986 filed Apr. 24, 2006, now U.S. Pat. No. 7,783,853 issued on Aug. 24, 2010, entitled "MEMORY USAGE TECHNIQUES IN MIDDLEWARE OF A REAL-TIME DATA DISTRIBUTION SYSTEM", by Stephen Jisoo Rhee, Yi Dai, Gerardo Pardo-Castellote, and Rajive Joshi, which is incorporated by reference herein for all purposes.

This application is related to co-pending and concurrently filed application Ser. No. 11/410,511 filed Apr. 24, 2006, entitled "FLEXIBLE MECHANISM FOR IMPLEMENTING THE MIDDLEWARE OF A DATA DISTRIBUTION SYSTEM OVER MULTIPLE TRANSPORT NETWORKS", by Rajive Joshi, Henry Choi, and Gerardo Pardo-Castellote, Stefaan Sonck Thiebaut, which is incorporated by reference herein for all purposes.

BACKGROUND OF THE INVENTION

In multithread computing environments, multiple threads of execution can effectively be executed. Multithreaded programs present many difficult challenges as, for example, multithreaded applications require careful design and coordination of resources among multiple threads.

Referring to FIG. 1A, consider an example of computer code that computes the cumulative sum of numbers passed to it by the calling thread. FIG. 1A shows the pseudo-code for a function cumulative_sum(value) that computes, prints, and returns the running total of the numbers passed to it by a calling thread. In a single threaded environment this function works as expected; thus:

|  |  |
| --- | --- |
| cumulative_sum(1) | prints 1 |
| cumulative_sum(1) | prints 2 |
| cumulative_sum(1) | prints 3 | and so on. Internally, this function keeps a static variable called running_total to keep track of the cumulative sum so far. The static variable, by definition, is shared between different invocations of the function.

Now, consider a multithreading environment, where two threads A and B concurrently invoke cumulative_sum( ). One possible execution scenario is shown in FIG. 1A. The diagram shows the program code line numbers, and sequence in which they are executed by the two threads. In this scenario, thread B executes a line of code right after thread A has executed it, thus interleaving the execution of the two threads: A: Line 1, B: Line 1, A: Line 2, B: Line 2, A: Line 3, B: Line 3, A: Line 4, B: Line 4, A: Line 5, B: Line 5. As a consequence, both threads clobber each other's execution by modifying the shared static variable running_total, such that both threads produce incorrect results.

The conventional way to prevent the two threads from "clobbering" (or adversely interfering with) each other is to protect access to the shared variable running_total, as shown in FIG. 1B. Referring to FIG. 1B, a lock is taken before modifying the value of the shared variable running_total, and unlocked after changing the shared variable. This guarantees that only one thread is modifying the shared variable at a time. However, as shown in FIG. 1B, this approach still does not guarantee that results of the two independent threads will not interfere with each other, since the running_total variable is still shared among the threads.

In view of the foregoing, an improved framework for executing multiple threads and sharing resources in a multithreaded programming environment would be highly useful.

A scenario where multithreading presents additional challenges includes implementing the middleware for a data distribution system. FIG. 14 depicts a data distribution middleware that decouples producers and consumers of Data in a domain. Data Distribution Service (DDS) is a formal standard from the Object Management Group (OMG) popular in embedded systems, especially in industrial automation, aerospace, and defense applications. DDS specifies an API designed for enabling real-time data distribution. It uses a publish-subscribe communication model, and supports both messaging and data-object centric data models.

DDS uses a publish-subscribe (P-S) communication model. The P-S communication model uses asynchronous message passing between concurrently operating subsystems. The publish-subscribe model connects anonymous information producers with information consumers. The overall distributed system is composed of processes, each running in a separate address space possibly on different computers. We will call each of these processes a "participant application". A participant may be a producer or consumer of data, or both.

Data producers declare the topics on which they intend to publish data; data consumers subscribe to the topics of interest. When a data producer publishes some data on a topic, all the consumers subscribing to that topic receive it. The data producers and consumers remain anonymous, resulting in a loose coupling of sub-systems, which is well suited for data-centric distributed applications. DDS targets real-time systems; the API and Quality of Service (QoS) are chosen to balance predictable behavior and implementation efficiency/performance.

The DCPS model builds on the idea of a "global data space" of data-objects that any entity can access. Applications that need data from this space declare that they want to subscribe to the data, and applications that want to modify data in the space declare that they want to publish the data. A data-object in the space is uniquely identified by its keys and topic, and each topic must have a specific type. There may be several topics of a given type. A global data space is identified by its domain id, each subscription/publication must belong to the same domain to communicate.

The data distribution middleware handles the actual distribution of data on behalf of a user application. The distribution of the data is controlled by user settable Quality of Service (QoS).

In view of the foregoing, an improved framework for executing multiple threads and sharing resources in a multithreaded computing environment would be highly useful.

SUMMARY OF THE INVENTION

Broadly speaking, the invention relates to techniques for execution of multiple threads in a multithreaded computing programming environment. It will be appreciated that the techniques are especially well suited for environments that use multilayered programming architecture where a higher layer can build on the functions provided by a lower layer.

One example is an environment where a multilayered middleware software acts as an mediator between an application program and an operating system.

In one aspect, the invention provides the conceptual notion of a "Worker" which can effectively serves to represent the thread-specific execution context for a thread of execution ("thread") in a multithreaded computing environment. In one embodiment, the Worker is effectively used to store all thread-specific context needed by operational computer code to execute (e.g., a function, method, procedure, module). In addition, a Worker can include or be associated with one or more objects that are in effect thread-specific and can be used to define the execution context as well as other applications (e.g., "time stamping," to determined how much time a thread spends in a particular layer or module). The Worker can be passed between various operational code portions (e.g., functions) in order to provide the execution context of the thread. This allows execution of multiple portions of operational code for a thread without having to lock any of the code activated (e.g., called, invoked) by the thread. As a result, the latency experienced in conventional systems where a single thread may effectively lock various portions of operational code can be minimized. Those skilled in the art will appreciate that the notion of a "Worker" allows writing computer programming source code without having to make assumption about the number of threads that would be supported by the code. As an example, middleware software can be written without regard to the number of threads that would be configured for a particular application or the number of threads that can actually be supported by various platforms (operating systems). Furthermore, a Worker can be associated (e.g., "bounded") to a thread at the entry point of middleware software, thereby allowing the number of threads for the application layer to be determined in a dynamic manner and by users. It will be appreciated that this "delayed" association of actual threads configured for applications enables an implementation to be effectively mapped to single or multi-thread environments that are supported by various platforms. As a result, software can be written in a simpler manner and the same software can effectively be used on various platforms with different multithreading configuration and support.

In another aspect, the invention provides the conceptual notion of an Exclusion Area (EA) to effectively protect resources that could be shared ("shared resources") between multiple threads. Generally, a Worker can conceptually interact with an Exclusion Area (EA) and shared resources can be protected based on this interaction. In one embodiment, an Exclusion Area (EA) can only be "visited" by a single Worker at a given time. This effectively protects the shared resource associated with the Exclusion Area (EA) from multiple threads accessing it because each Worker can be associated with a thread and effectively provide the execution context for the thread. In another embodiment, a numbering (or priority) scheme is effectively provided for the Exclusion Area (EA). By way of example, a number N can be provided as a property for the Exclusion Area (i.e., "EA.N"). Based on the numbers assigned to each Exclusion Area (EA), it can be determined whether a Worker can visit multiple Exclusion Areas (EAs) at the same time. For example, while visiting a first Exclusion Area (first EA), a Worker may be allowed to "visit" a second Exclusion Area (second EA), if the number assigned to the second EA is higher than the number assigned to the first EA being visited by the Worker, and so on. Thus, a Worker can effectively visit multiple EAs allowing a thread of execution to safely use multiple resources if they are not used by another thread. Further, similar to Worker, associating (e.g., binding) of an EA to a physical lock can be delayed and, for example, performed at the entry point to a middleware. As a result, one physical lock may be used to effectively protect numerous shared resources, thereby minimize delays experienced in conventional system where multiple physical locks would be used.

The Workers and EA framework is applied to the construction of multi-layered real-time middleware. The EAs protecting the shared resources in the internal middleware layers are mapped across the layers such that for a Data Reader (Data Writer) the incoming (outgoing) data path effectively uses a single physical lock. Furthermore, the incoming (outgoing) data paths of Data Readers (Data Writers) are independent of each other and can proceed concurrently as parallel threads of execution. The EA mapping scheme lends itself to mapping the EAs across the layers to use a single physical lock for a group of Data Readers (Data Writers), based on a user specified configuration policy.

The invention can be implemented in numerous ways, including a method, an apparatus, a computer readable medium, a computing device. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
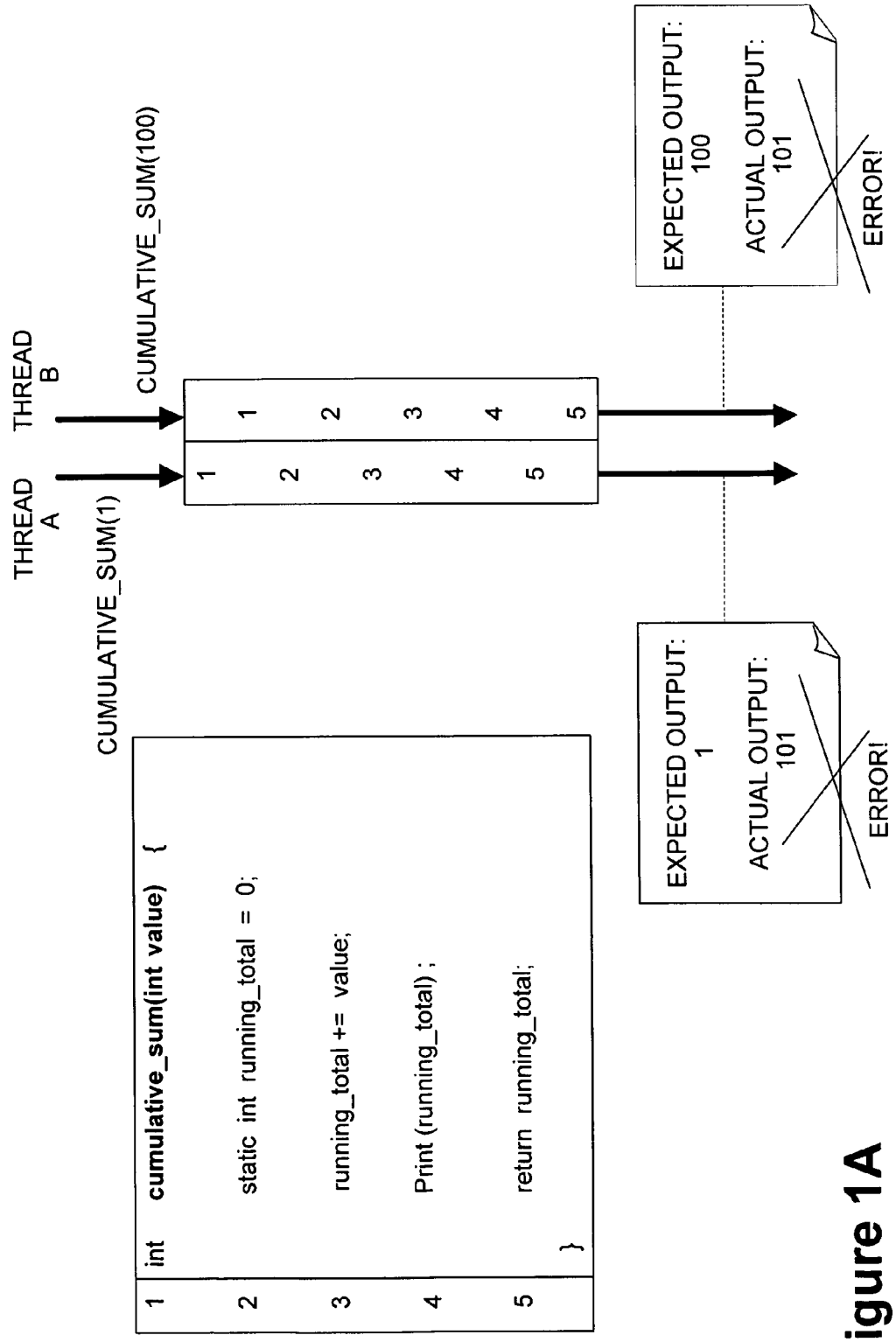
FIG. 1A shows the pseudo-code for a function cumulative_sum(value) that computes, prints, and returns the running total of the numbers passed to it by a calling thread.
Figure 1B:
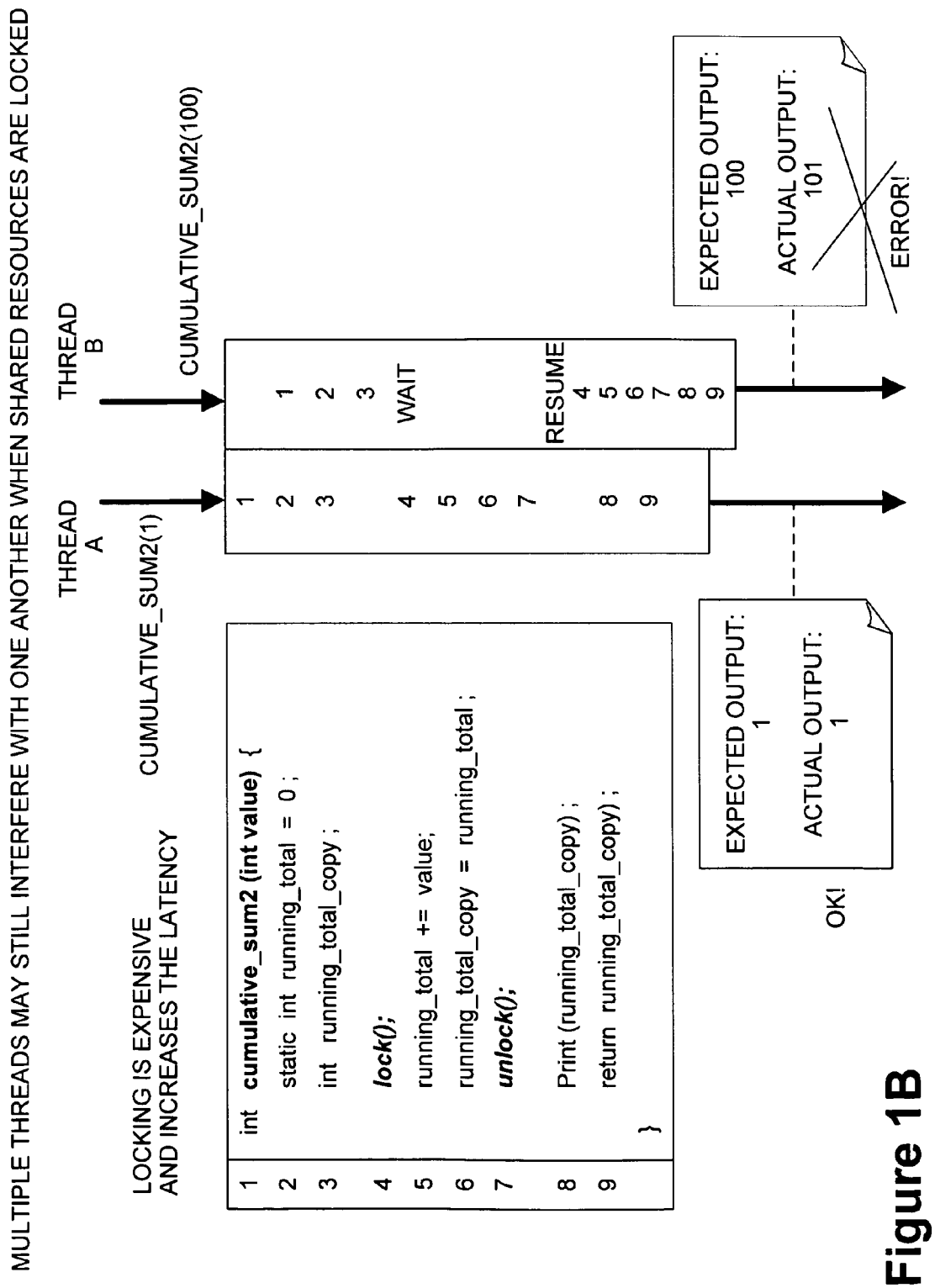
FIG. 1B shows a lock is taken before modifying the value of the shared variable running_total, and unlocked after changing the shared variable.

As noted in the background section, multithread computer environments present many difficult challenges. One way to avoid resource contention between multiple threads is to attach some storage that is local to a thread. Many modern operating (OS) systems provide the notion of a thread, and the notion of associating a thread-specific storage. However, the thread specific storage provided by the OS is a limited resource, and generally not enough to store significant state. Also, different operating systems implement thread specific storage in different ways; and some operating environments may not support this concept at all, or may not even support multi-threading. Accordingly, an improved framework for executing multiple threads and sharing resources in a multi-threaded programming environment would be highly useful.

Accordingly, the invention pertains to techniques for execution of multiple threads in a multithreaded computing programming environment. It will be appreciated that the techniques are especially well suited for environments that use multilayered programming architecture where a higher layer can build on the functions provided by a lower layer. One example is an environment where a multilayered middleware software, acts as an mediator between an application program and an operating system.

In one aspect, the invention provides the conceptual notion of a "Worker" which can effectively serves to represent the thread-specific execution context for a thread of execution ("thread") in a multithreaded computing environment. In one embodiment, the Worker is effectively used to store all thread-specific context needed by operational computer code to execute (e.g., a function, method, procedure, module). In addition, a Worker can include or be associated with one or more objects that are in effect worker-specific and can be used to define the execution context as well as other applications (e.g., "time stamping," to determine how much time a thread spends in a particular layer or module). The Worker can be passed between various operational code portions (e.g., functions) in order to provide the execution context of the thread. This allows execution of multiple portions of operational code for a thread without having to lock any of the code activated (e.g., called, invoked) by the thread. As a result, the latency experienced in conventional systems where a single thread may effectively lock various portions of operational code can be minimized. Those skilled in the art will appreciate that the notion of a "Worker" allows writing computer programming source code without having to make assumption about the number of threads that would be supported by the code. As an example, middleware software can be written without regard to the number of threads that would be configured for a particular application or the number of threads that can actually be supported by various platforms (operating systems). Furthermore, a Worker can be associated (e.g., "bounded") to a thread at the entry point of middleware software, thereby allowing the number of threads for the application layer to be determined in a dynamic manner and by users. It will be appreciated that this "delayed" association of actual threads configured for applications enables an implementation to be effectively mapped to single or multi-thread environments that are supported by various platforms. As a result, software can be written in a simpler manner and the same software can effectively be used on various platforms with different multithreading configuration and support.

In another aspect, the invention provides the conceptual notion of an Exclusion Area (EA) to effectively protect resources that could be shared ("shared resources") between multiple threads. Generally, a Worker can conceptually interact with an Exclusion Area (EA) and shared resources can be protected based on this interaction. In one embodiment, an Exclusion Area (EA) can only be "visited" by a Worker at a given time. This effectively protects the shared resource associated with the Exclusion Area (EA) from multiple threads accessing it because each Worker can be associated with a thread and effectively provide the execution context for the thread. In another embodiment, a numbering (or priority) scheme is effectively provided for the Exclusion Area (EA). By way of example, a number N can be provided as a property for the Exclusion Area (i.e., "EA.N"). Based on the numbers assigned to each Exclusion Area (EA), it can be determined whether a Worker can visit multiple Exclusion Areas (EAs) at the same time. For example, while visiting a first Exclusion Area (first EA), a Worker may be allowed to "visit" a second Exclusion Area (second EA), if the number assigned to the second EA is higher than the number assigned to the first EA being visited by the Worker, and so on. Thus, a Worker can effectively visit multiple EAs allowing a thread of execution to safely use multiple resources if they are not used by another thread. Further, similar to Worker, associating (e.g., binding) of an EA to a physical lock can be delayed and, for example, performed at the entry point to a middleware. As a result, one physical lock may be used to effectively protect numerous shared resources, thereby minimize delays experienced in conventional system where multiple physical locks would be used.

Embodiments of these aspects of the invention are discussed below with reference to FIGS. 1A-17D. However, those skilled in the art will readily appreciate that the detailed description given herein with respect to these figures is for explanatory purposes as the invention extends beyond these limited embodiments.

Figure 1C:
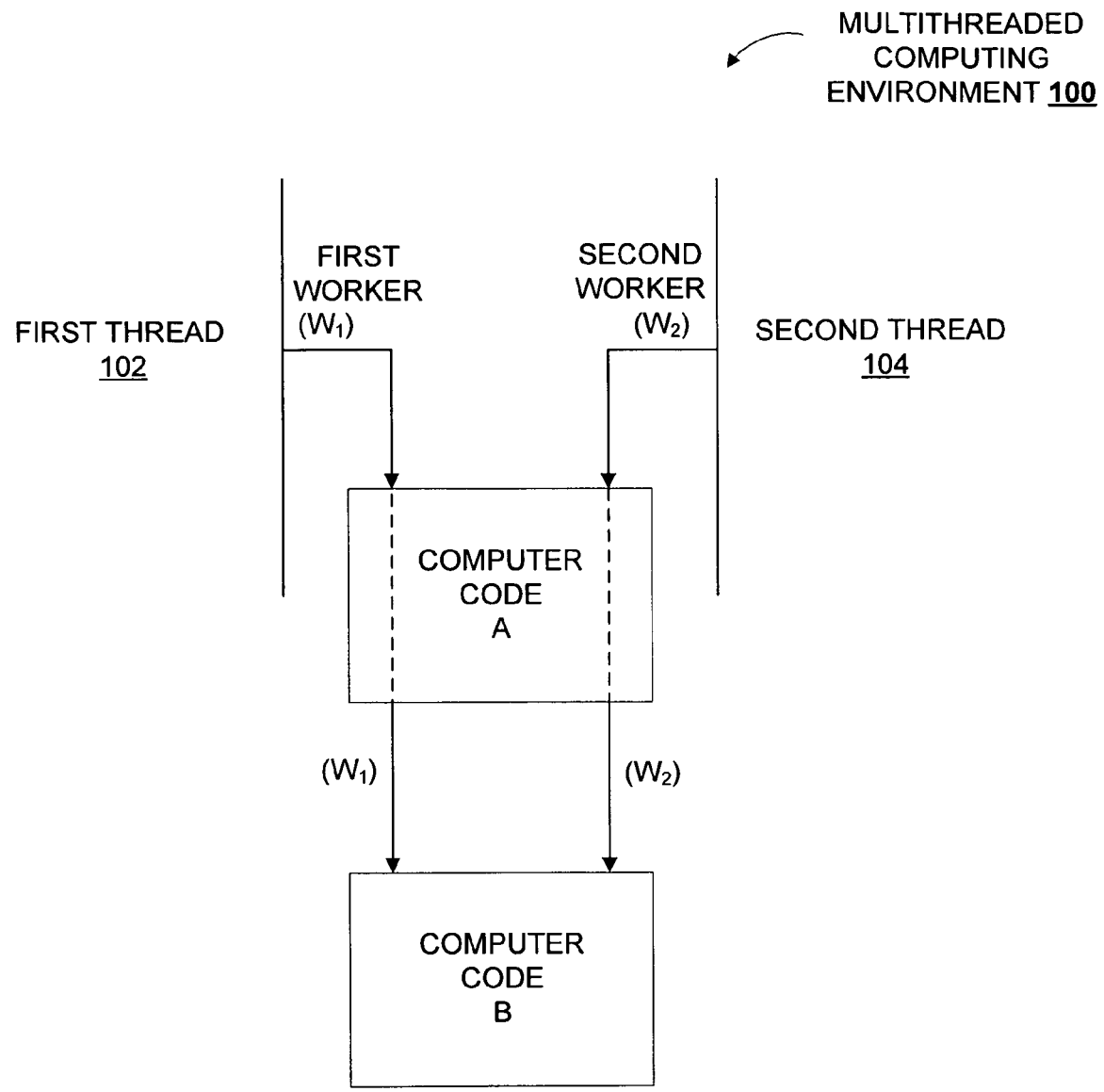
FIG. 1C depicts a multi-threaded computing environment in accordance with one embodiment of the invention.

FIG. 1C depicts a multi-threaded computing environment 100 in accordance with one embodiment of the invention. Referring to FIG. 1C, the interaction between a first thread of execution (or first thread) 102 and computer code A is depicted conceptually. Typically, the computer code A includes operational code that performs a function. Operational code can be effectively activated for execution by the first thread. First thread of execution (or first thread) 102 represents a single thread of execution in the multi-threaded computing environment 100. In the multi-threaded computing environment 100, a second thread of execution (second thread) 104 can also interact with the computer code A. Typically, the computer code A represents one or more computer executable instructions that are arranged as a sequence or block of computer instructions. The sequence or block of computer instructions can, for example, implement a function (e.g., mathematical or logical function). As such, the computer code A can, for example, represent or include a function, method, or procedure as is known to those skilled in the art.

In general, the computer code A can be represented as a mathematical function (e.g., f(x)) that may receive input (e.g., x) and produce output (e.g., y=f(x)). As such, the interaction between the first thread 102 and the computer code A can be generally thought of as invocation, or call to a generic function (e.g., f(x)). This interaction can be characterized as execution of computer code A by the first thread of execution (or first thread). The execution of computer code A can effectively provide as input one or more parameters (e.g., x) to the function and receive as output one or more values or results. Moreover, a first thread-specific execution context (or Worker $W_1$) can be effectively provided to the computer code A in accordance with one aspect of the invention. It should be noted that the first thread-specific execution context ($W_1$) can be provided in addition to any parameter(s) that are normally provided to computer code A. Furthermore, it will be appreciated that the first thread-specific execution context (Worker $W_1$) is execution context that is specifically provided for execution of computer code (e.g., computer code A) by the first thread 102. As such, the thread-specific execution context (Worker $W_1$) effectively defines the execution context in order to execute computer code A when the first thread 102 activates (e.g., invokes or calls) computer code A (e.g., when thread A calls a particular function, method, procedure, or module).

It will be appreciated that the thread-specific context (Worker $W_1$), among other things, can effectively serve as a "work sheet" that is provided by or on behalf of the first thread 102. The "work sheet" (or Worker) can be provided to computer code A and used to do "work" for (or in the context of) the first thread 102. Similarly, a second thread-specific execution context (Worker $W_2$) can be provided for the second thread 104, allowing execution of computer code A for the second thread 104 in the context defined by the second thread-specific context (Worker $W_2$).

Those skilled in the art will appreciate that providing thread-specific execution context (e.g., $W_1$, $W_2$) for threads (e.g., first and second threads 102 and 104), allows multiple threads to effectively access the same computer code without requiring each thread to lock the computer code. Referring to FIG. 1C, first and second threads 102 and 104 can effectively access the computer code A at the same time. Moreover, first thread 102 need not effectively lock the computer code A to prevent the second thread 104 from accessing the computer code A when the first thread 102 is executing the computer code A. Similarly, the computer code A need not be locked for execution by the second thread 104. This can be accomplished because computer code A can be executed in different contexts for different threads, thus allowing multiple threads to execute computer code A without interfering with each other in a safe manner without having to implement conventional locking mechanisms that typically adversely affect performance.

In accordance with another aspect of the invention, a thread-specific execution context (or Worker $W_i$) can be effectively passed between computer codes that interact with each other. Referring back to FIG. 1C, the first thread-specific execution context (or first Worker $W_1$) is effectively passed to a second computer code B which may somehow interact with the first computer code A. The interaction of computer code A and B can, for example, be the result of invocation or calling of the second computer code B from or by code of the computer code A. By way of example, computer code A can be a first function ($F_A$) that calls another function ($F_B$), such as a function $F_A(F_{B(\ )})$. In any case, passing the first thread-specific execution context ($W_1$) through multiple interrelated portions of computer code allows the first thread to effectively use multiple pieces of computer code (e.g., functions, blocks of code, modules, procedures, methods) without having to lock any of them, so that the same pieces of code can be used by the second thread. Similarly, the execution context for the second thread (or Worker $W_2$) can be effectively passed through multiple pieces of code that may be interrelated, for example, in a chain of calls or invocations.

Figure 2:
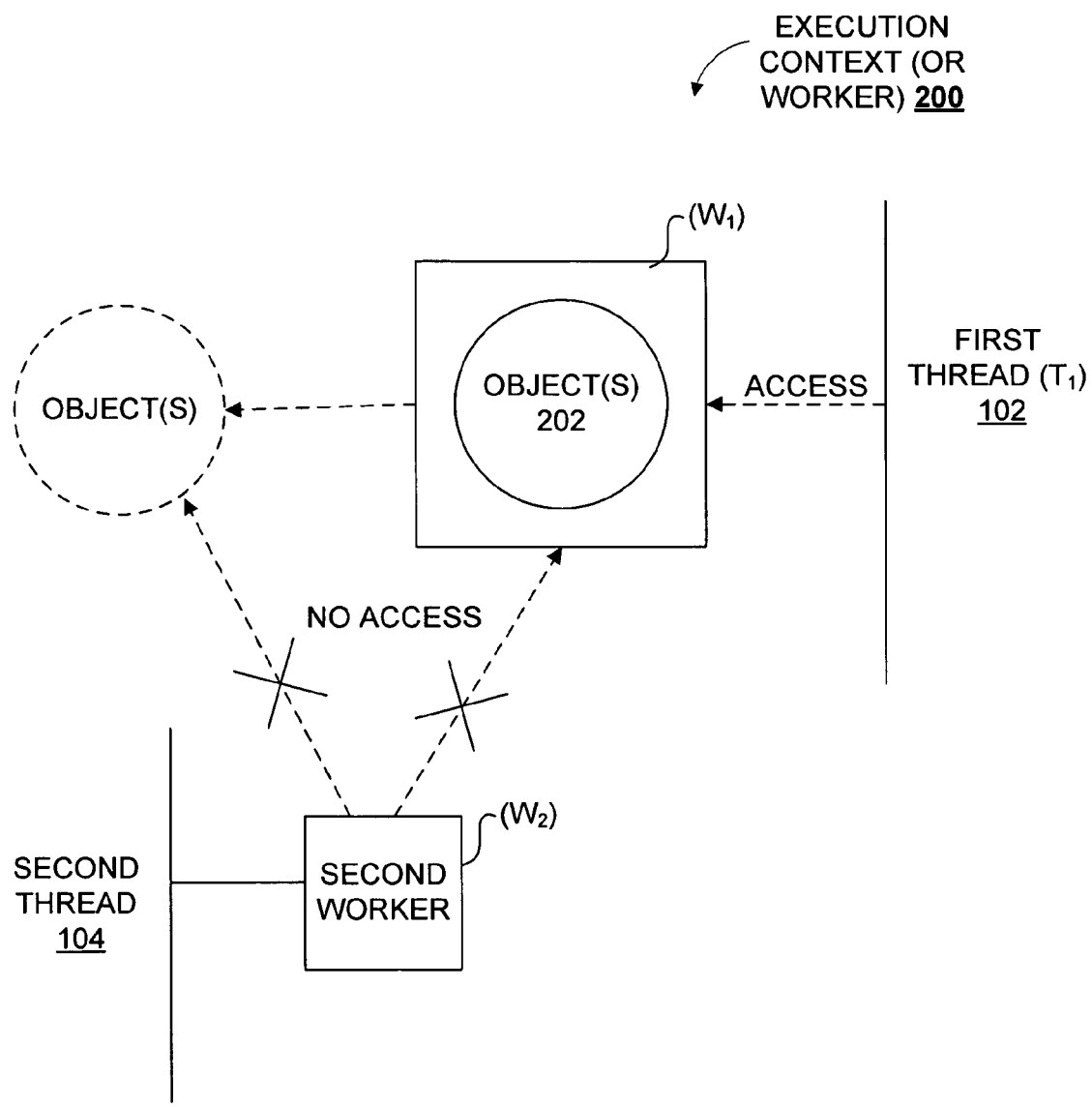
FIG. 2 depicts thread-specific execution context (or Worker $W_1$) 200 in accordance with one embodiment of the invention.

FIG. 2 depicts a thread-specific execution context (or Worker $W_1$) 200 in accordance with one embodiment of the invention. The thread-specific execution context 200 represents an execution context associated with a first thread $T_1$ 102 (also shown in FIG. 1C). Referring to FIG. 2, the execution context (or Worker) 200 represents memory (or storage) associated with the first thread 102. This memory (or storage) can be accessed by the first thread 102, as suggested in FIG. 2. However, it should be noted that a second thread 104 is not able to excess the memory (or storage) representative of the thread-specific execution context (or Worker or $W_1$) 200. In accordance with one embodiment of the invention, no other thread of execution may access the thread-specific execution context (or Worker or $W_1$) 200, thereby ensuring that no other thread can manipulate the execution context of another thread.

Those skilled in the art will also appreciate that the execution context (or Worker) 200 can effectively include (or reference) one or more objects 202. In effect, these objects (202) are worker-specific objects that can be provided for a particular thread, namely, the first thread 102, as a part of the thread-specific execution context (or Worker) 200. In order to execute computer code for the thread, one or more objects 202 can be used to define the context of execution and/or manipulated by one or more pieces of computer code (e.g., functions) as it is passed through various pieces of computer code effectively activated (e.g., invoked or called) by the thread. It should be noted that one or more objects 202 are not accessible to the second thread 104.

Figure 3:
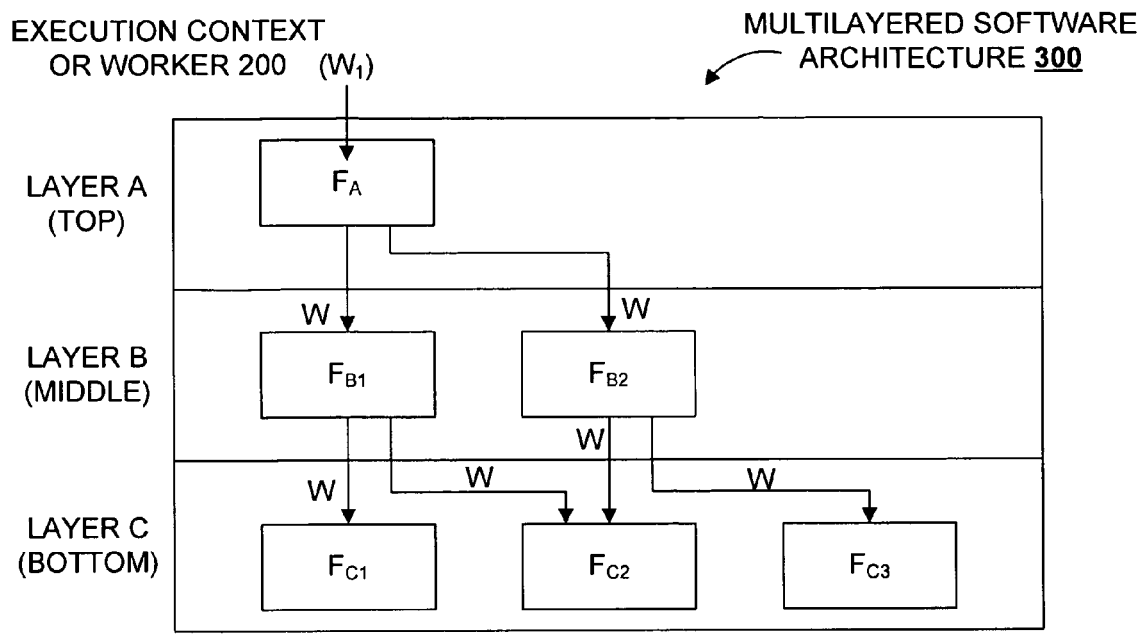
FIG. 3 depicts a conceptual model of a multilayered software component in accordance with one embodiment of the invention.

To further elaborate, FIG. 3 depicts a conceptual model of a multilayered software 300 in accordance with one embodiment of the invention. The general concept of multilayered software architecture is known to those skilled in the art. In brief, this model allows designing software in multiple layers that relate to each other. Generally, a top layer (A) directly interacts with a lower layer (B), and vice versa. Referring now to FIG. 3, three layers A, B and C are depicted in a hierarchical relationship that respectively defines them as top, middle, and a bottom layer(layer A, B and C). Further, each layer can include computer code that effectively builds on (or uses) computer code in a lower layer. For illustrative purposes, computer code is represented as a generic, logical, or mathematical function (e.g., $F_A$ which is a function in the top layer A). As such, a function ($F_A$) in the top layer A can, for example, build on functions $F_{B1}$ and/or $F_{B2}$ provided (or implemented) by the middle layer B, and so on. Thus, activation (e.g., calling, invocation) of operational code in $F_A$ can in turn activate functions $F_{B1}$ and $F_{B2}$ in the middle layer B. Similarly, activation of operational code in $F_{B1}$ and $F_{B2}$ can, for example, activate operational code of function $F_{C1}$, $F_{C2}$, $F_{C3}$ of the bottom layer C.

Those skilled in the art will appreciate that the thread-specific execution context (Worker $W_1$) 200 (also shown in FIG. 3) can effectively be passed through the functions of the different layers (A, B and C). More particularly, function $F_A$ can pass the execution context ($W_1$) 200 to the functions it builds upon, as it effectively activates them. As an example, function $F_A$ can activate functions $F_{B1}$ and $F_{B2}$ in the middle layer B, and so on. It should also be noted that the interaction between the layers may be extremely complex where, for example, a function $F_2$ in the bottom layer may be called by multiple activated functions ($F_{B1}$ and $F_{B2}$). Nevertheless, the thread-specific execution context for different threads may be passed through various functions in multiple layers, thereby allowing multiple threads to effectively use various functions in different layers at the same time without interfering with each other. It should be noted that the functions depicted in FIG. 3 need not be locked for execution by other threads as would be required by conventional multi-threading techniques where a single thread of execution may effectively lock numerous functions in a multilayer software architecture. As such, the invention is especially useful for multilayered software where multiple functions may be called by a single thread of execution because, among other things, the latency of the conventional systems primarily caused by numerous locks taken by a single thread can be minimized. Further, concurrency can be maximized as a Worker can be assigned to each of any number of threads, as will be discussed in greater detail below.

Figure 4:
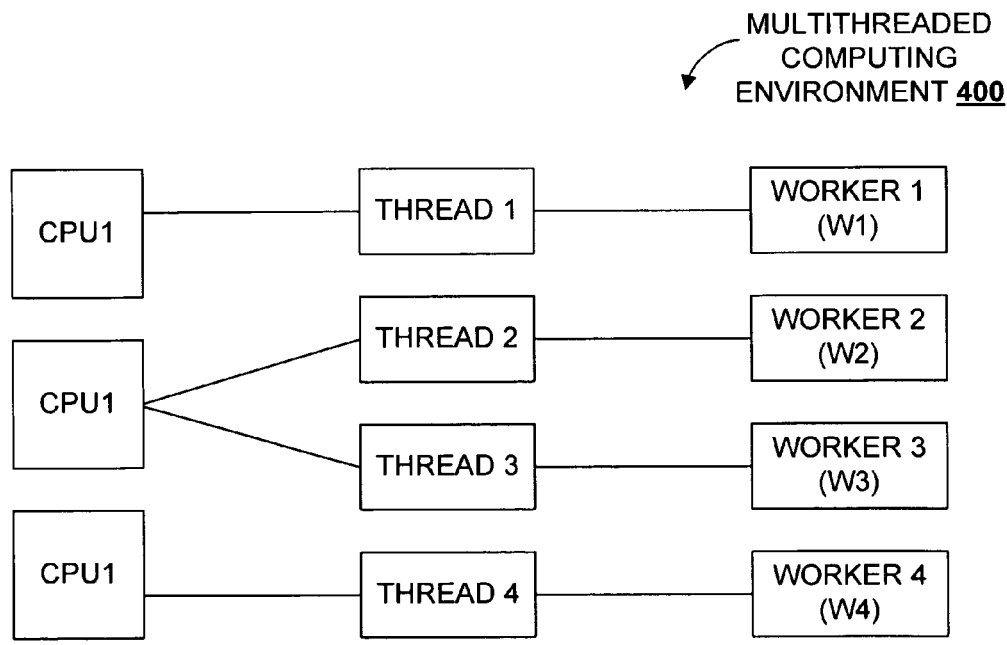
FIG. 4 depicts a computing environment in accordance with one embodiment of the invention.

It should be noted that threads may be executed on the same processor or multiple processors. In any case, an execution context (or Worker) can be effectively associated with each thread of execution and passed through as operational (or active) code is activated in various paths of execution taken by the thread. FIG. 4 depicts a multithreaded computing environment 400 in accordance with one embodiment of the invention. As shown in FIG. 4, multiple Central Processing Units (CPUs) can be used to execute threads in parallel and/or multiple threads can be executed on the same CPU (e.g., time slicing as known to those skilled in the art). In any case, for each thread, a thread-specific execution context (or Worker) is provided that is generally not made available or accessible to other threads of execution. Thus, although threads 2 and 3 may be executed on the same CPU, a separate Worker (2 and 3) can be provided for each thread and used to execute code separately in the context of each thread.

Figure 5:
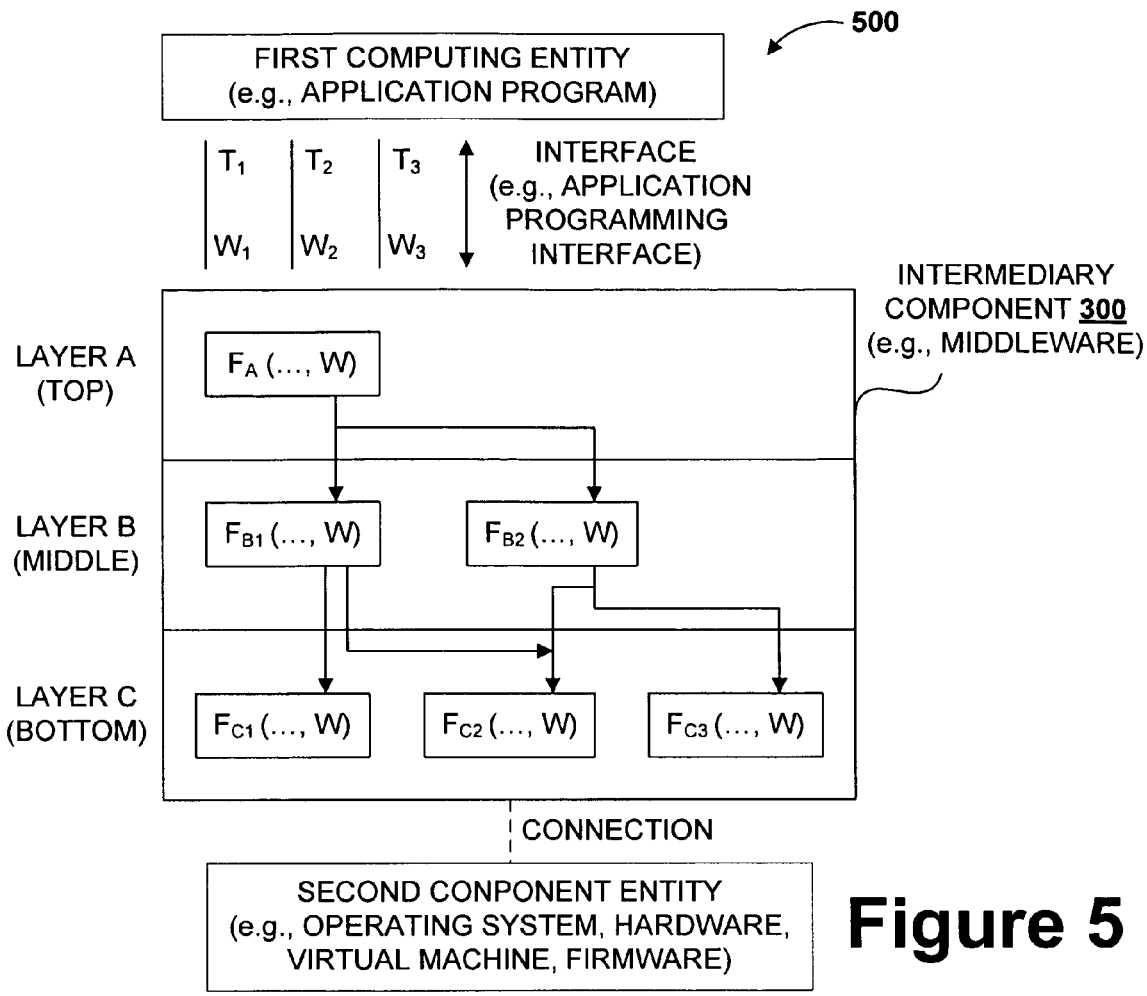
FIG. 5 depicts a computing environment where a multilayered software is provided as intermediary software (e.g., middleware) between two other computing entities, namely, a first computing (e.g., application program) and a second computing entity in accordance with one embodiment of the invention.

The association between a thread and an execution context (or Worker) can, for example, be made by effectively "binding" a "Worker" to the thread in accordance with one embodiment of the invention. To further elaborate, FIG. 5 depicts a computing environment 500 where the multilayered software 300 (also shown in FIG. 3) is provided as intermediary component (e.g., middleware) between two other computing components, namely, a first computing component (e.g., an application program) and a second computing component. The first computing component uses an interface (e.g., application programming interface) to interact with the intermediary component 300. The intermediary component 300 is connected to the second computing component (e.g., operating system (OS), hardware, virtual machine (VM), firmware). As such, the intermediary component 300 allows the first component (e.g., application program) to access the second computing component indirectly (i.e., via the multiple layers of the intermediary component 300). Referring to FIG. 5, a function $F_A$ in a layer A of the intermediary component 300 is implemented with a parameter W that can, for example, be an input/output parameter to have a reference (or pointer) to the execution context (or Worker W) as a parameter (W*). In the described embodiment, the execution context (or Worker W) is represented as the last parameter, or a parameter N of parameters that can be numbered from 1 to N ($P_1, \ldots, P_N$).

However, it will be appreciated that Worker can be any one of the parameters ($P_1, \ldots, P_N$), where $N \geq 1$, for any of the functions implemented in the multilayered architecture depicted for the intermediary 300. As such, functions $F_{B1}$, $F_{B2}$, $F_{C1}$, $F_{C2}$ and $F_{C3}$ can also be implemented to receive the execution context (W) for a thread as a parameter, for example, as a reference or pointer (W). Thus, each one of the threads $T_1$, $T_2$ and $T_3$ can execute a function $F_A(\ldots, W)$ at the first layer by providing their associated Worker parameter to the function $F_A$ which, in turn, would pass the Worker (W) as a parameter to lower layers. Moreover, it will be appreciated that this association can be made in a dynamic manner when the number of threads that are needed for a particular application becomes known. In other words, the intermediary component 300 (e.g., a multilayered middleware) can be written without making assumption about the number of threads that are or can be supported by either the first or second computing components around the intermediary component 300. As a result, implementation of the intermediary component 300 for multi-threading applications can be immensely simplified. Further, the intermediary component 300 can easily be ported to various environments with different levels of multi-threading support ranging from those that provide no multi-threading support to those that can support numerous threads at the same time. By way of example, when it is determined that the first computing entity (e.g., a first application program) requires three (3) threads, three (3) execution contexts (or Workers) can be respectively associated (e.g., bounded) to each thread of execution ($T_1$, $T_2$ and $T_3$). Similarly, for another application program (not shown) that requires five (5) threads, five Workers can be provided and respectively associated with the threads such that each thread has its own associated Worker. However, it should be noted that actual multi-threading support provided by the second computing component (e.g., operating system) may differ than the number of threads (or Workers) that can be effectively configured for the first computing component (e.g., application program). By way of example, three (3) threads may be effectively associated with three (3) Workers for an application program (as the first component depicted in FIG. 5). However, there may be no actual multithreading support for a particular operating system (provided as the second computing component that supports the application program), so the application program can effectively be treated by the operating system as a single thread. The same intermediary component 300 and mechanisms can be used to effectively configure the application with three (3) threads on another operating system that provides multi-threading support for these threads. Accordingly, those skilled in the art will appreciate that intermediary component (e.g., middleware software) can be written without making any assumption about the multithreading component interact with it. Further, the same intermediary component can support (i.e., serve as an intermediary) other computing components irrespective of their different and seemingly incompatible levels of multithreading configuration or support.

As noted above, a thread may be associated (e.g., "bounded") to an execution context (or Worker). Moreover, this association can be made at the top layer of a multilayered architectural design. Referring to FIG. 5, the association between the three (3) threads $T_1$, $T_2$ and $T_3$ and Workers ($W_1$, $W_2$ and $W_3$) can be effectively made at the top layer A. Moreover, this association can be made in a dynamic manner when the number of threads to be configured for a particular application becomes known. To further elaborate, the process of associating a thread to an execution context (or Worker) is described below.

Figure 6:
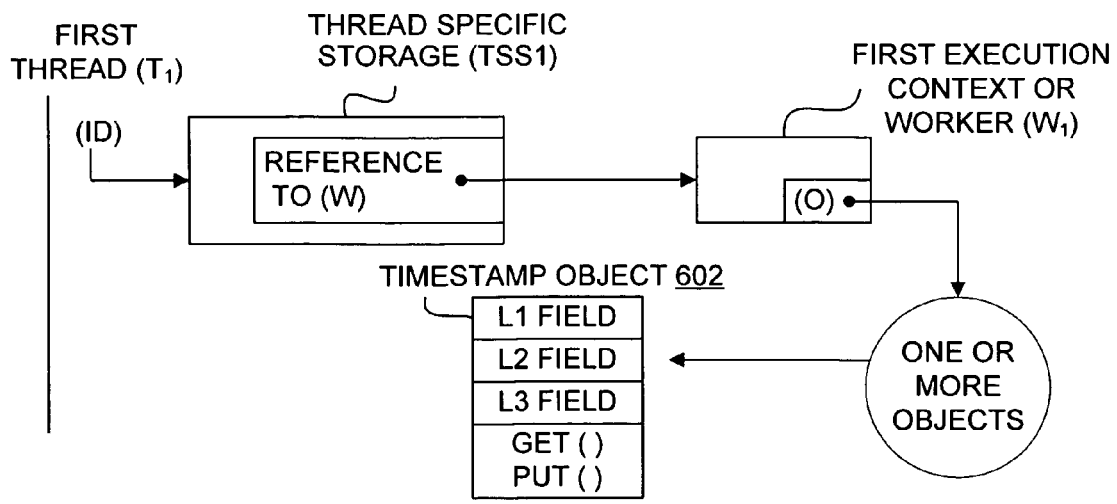
FIG. 6 depicts a first thread ($T_1$) which has been "bounded" to a first execution context in accordance with one embodiment of the invention.

Referring now to FIG. 6, a first thread ($T_1$) which has been "bounded" to a first execution context (or first Worker $W_1$) is depicted. Those skilled in the art will know that a particular thread (e.g., first thread $T_1$) can be associated with a thread-ID (e.g., a number). Further, a thread-specific storage ($TSS_1$) can be effectively allocated for use of the first thread $T_1$ (e.g., thread $T_1$ can be "bounded" to a thread-specific storage). As such, the thread-specific storage ($TSS_1$) can serve as a storage area for the first thread $T_1$. Typically, other threads (e.g., a second thread $T_2$) are excluded from accessing the thread-specific storage ($TSS_1$) allocated for the first thread. In the described embodiment shown in FIG. 6, a reference to the execution context or Worker ($W_1$) is allocated in the thread-specific storage ($TSS_1$). Further, a reference is allocated to one or more objects associated with the first execution context (or Worker) $W_1$. Those skilled in the art will appreciate that virtually anything can be represented by the object(s) that are associated or included in the first execution context (or Worker $W_1$) "bounded" to the first thread. Generally, these object(s) can be used to define or provide the context of the execution for a particular thread (e.g., first thread $T_1$). Moreover, it should be noted that objects "bounded" to a particular thread can have many additional benefits and applications. By way of example, a "timestamp" object 602 is depicted with 3 fields, each representing a layer of the intermediary entity 300. Timestamp object 602 also provides functions or methods (e.g., get( ), put( )) which operate to get a timestamp (e.g., current time) and put (or write) it into the fields as a particular thread traverses the layers of the intermediary component 300 (e.g., a middleware). It will be appreciated that the timestamp object 602 allows measuring the amount of time a particular thread spends in each layer of the intermediary component 300.

Figure 7:
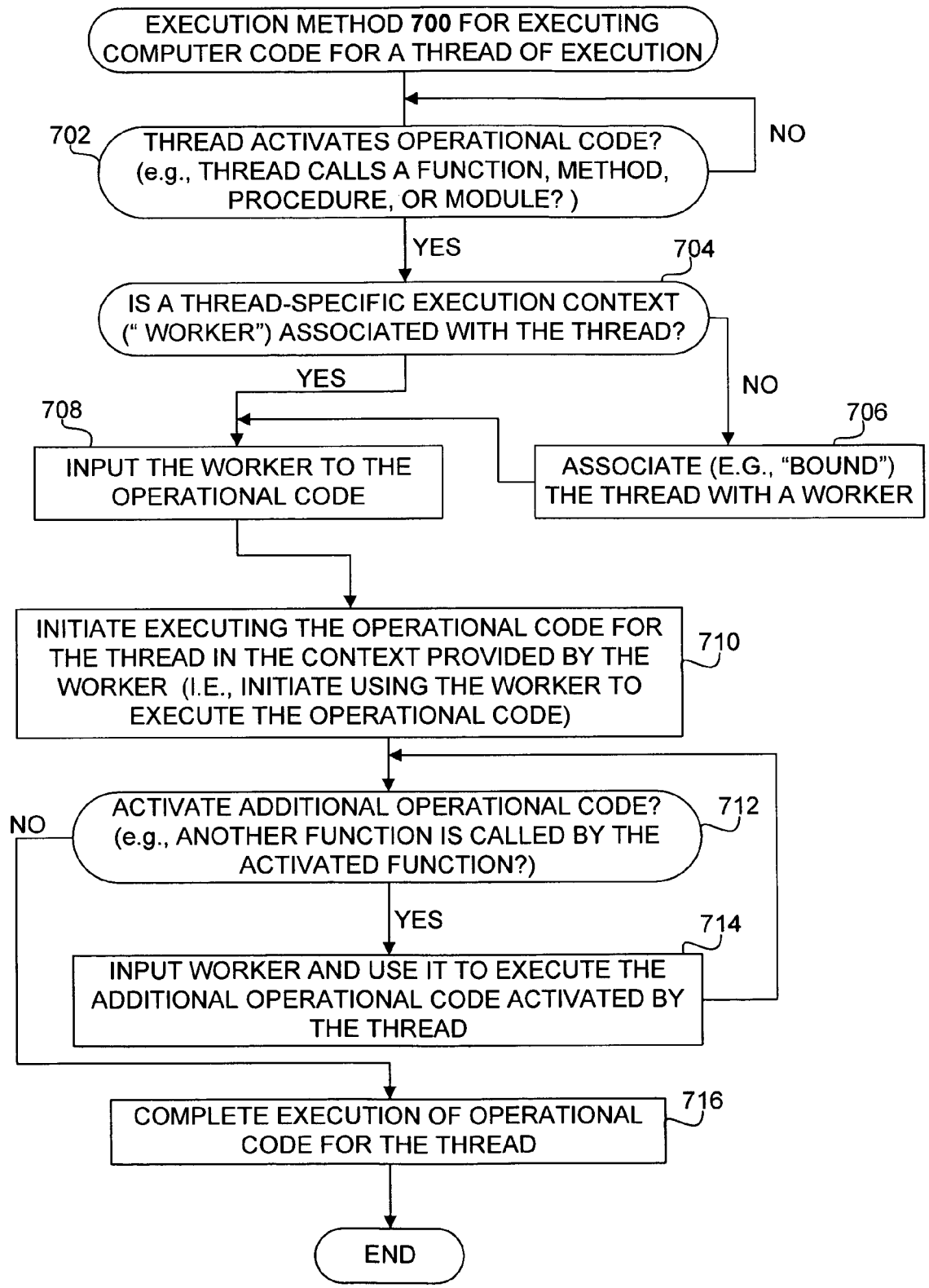
FIG. 7 depicts an execution method 700 for executing computer code for a thread of execution in accordance with one embodiment of the invention.

FIG. 7 depicts an execution method 700 for executing computer code for a thread of execution in accordance with one embodiment of the invention. Initially, it is determined (702) whether a thread activates operational code (e.g., whether the thread calls a function, method, procedure module). If it is determined (702) that the thread activates operational code, it is determined (704) whether a thread-specific execution context ("Worker") is associated with the thread. Accordingly, a Worker can be associated (e.g., "bounded") (706) to the thread, if it is determined (704) that a Worker has not been associated with the thread. Thereafter, the Worker is provided (708) to the operational code. Next, execution of the operational code is initiated (710) for the thread in the context provided by the Worker. In other words, execution of the operational code can be initiated using the Worker.

As noted above, activation (of execution) of a first operational computer code can effectively activate additional operational code. By way of example, a function (or method) in a first code portion can call another function (or method) in a second code portion. As such, it is determined (712) whether to activate additional operational code. Accordingly, the Worker can be passed (714) to additional operational code, as many times as it may be necessary, thereby allowing additional operational code to be executed in the context of the thread. The Worker is used to execute additional operational code(s) for the thread. Finally, the execution of the operational code for the thread is completed (716), and the execution method 700 ends.

Figure 12:
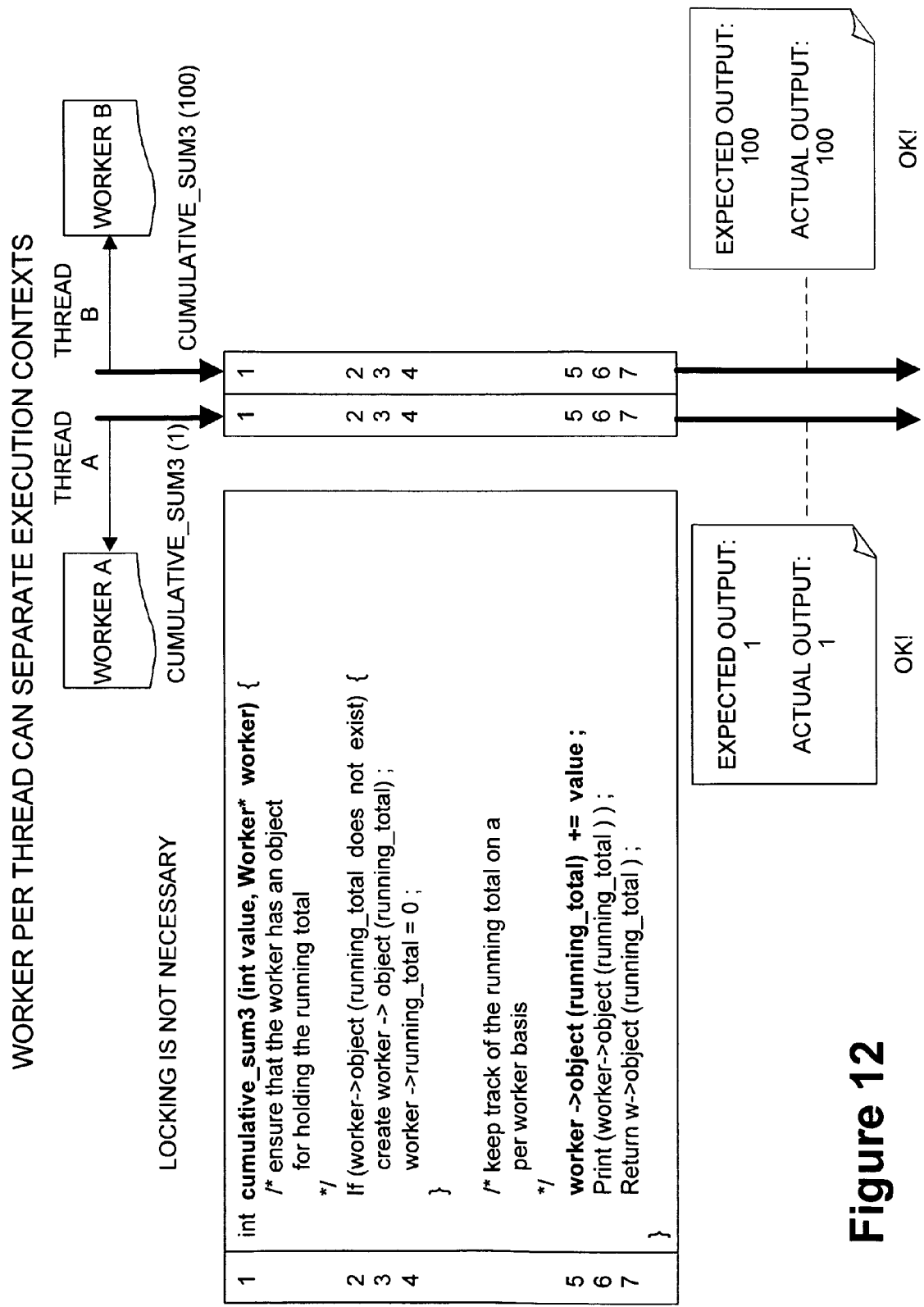
FIG. 12 shows the cumulative_sum3(value, worker), stores the running_total in an object attached to the worker that is passed in as a parameter.

Referring back to FIGS. 1A-B, some of the challenges and problems associated with conventional multithread techniques are illustrated. To overcome these limitations, and to make the code independent of a particular operating system or environment, the notion of a "Worker" can be used as shown in FIG. 12 in accordance with one embodiment of the invention. In the embodiment shown, a worker is an object in program memory that represents a thread specific execution context, and can be thought of as a logical thread in which a block of code executes. In this example, the worker is passed in as the last parameter of the function, e.g., cumulative_sum3 (value, worker), and provides the logical execution context in which the function executes. A physical operating system thread is bound to one and only one worker, as shown in FIG. 12. This binding happens before calling program code uses a worker.

The program code using the worker execution context (or logical thread) can associate worker specific objects with a worker, to store state that must be maintained on a per worker basis. Thus, as shown in FIG. 12, the cumulative_sum3 (value, worker), stores the running_total in an object attached to the worker that is passed in as a parameter. This allows two concurrent invocations of the code to produce the correct results (see Figure); since each invocation maintains its own running_total, there is no danger of clobbering or interfering with one another.

To overcome the limitations of the conventional multithreading environments, those skilled in the art should observe the following. A "Worker" can be provided as a logical abstraction of the notion of a thread. The Worker represents the context in which a method is invoked, and can be passed as a parameter to all the internal methods in the middleware. A Worker can be associated with named objects, to store additional Worker specific state. For example, a time-stamping object can be attached to a worker to record the time-stamps as a thread traverses the different middleware layers. A Worker can be bound to a specific thread at the entry points into the middleware from user code and callbacks. This can, for example, be done by storing the Worker pointer in thread specific storage, provided by the Operating System (OS). This design allows the thread specific storage to be effectively quite large.

It should be noted that the concept of a Worker and the notion of associating objects per Worker enables several benefits, not afforded by conventional approaches. These include: (1) the program code is independent of assumption about the operating system or environment in which it operates; (2) the worker can be bound to physical OS threads at the user interface layers, in possibly different ways depending on the operating system or environment; (3) attaching objects per worker allows the program code to store unlimited amounts of execution context specific state, thereby solving two related issues: preventing resource contention and preventing interference by putting resources on a per worker basis. Since locks do not needed to be taken for resources that are only used on a per execution context (worker) basis, the extra locking latency is avoided, and concurrency is maximized.

Another aspect of the invention pertains to techniques for protecting resources of a computing environment from multiple threads. In multithreaded programming environment, a resource can be shared between multiple threads (i.e., a shared resource). It will be appreciated that an Exclusion Area (EA) can serve as a logical lock to protect a shared resource in a multithreaded environment.

Figure 8A:
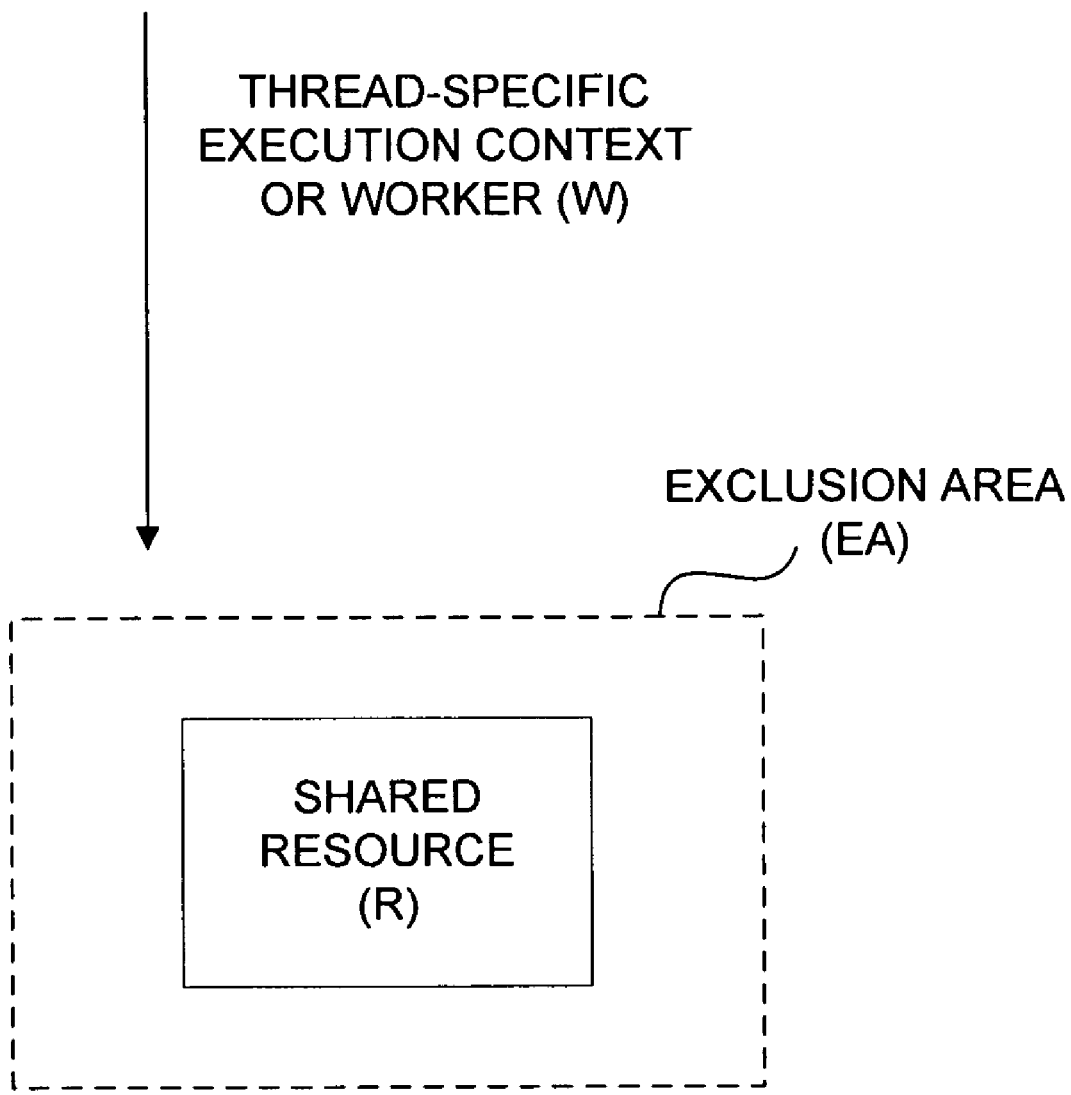
FIG. 8A conceptually depicts an Exclusion Area (EA) as an area or boundary that protects a shared resource (R) in accordance with one embodiment of the invention.

Referring now to FIG. 8A, an Exclusion Area (EA) is conceptually depicted as an area or boundary that protects a shared resource (R). The Exclusion Area (EA) is provided as a logical mechanism for protecting a Shared Resource (R) in a multi-threaded programming environment. Those skilled in the art will appreciate that the logical Exclusion Area (EA) can be combined with the notion of a thread-specific context (or Worker) to effectively implement a multi-threaded environment. More particularly, multiple threads that are each respectively associated with a Worker can interact with the Exclusion Areas (EAs) provided to protect shared resources (R's). In other words, the notion of a Worker and an Exclusion Area (EA) can be used to implement a multi-threaded environment where multiple threads can safely share resources, yet the benefits of using Workers can be utilized, as well as additional benefits, as will be discussed below.

In general, an EA can be provided, used, or passed to a Shared Resource (R) in order to protect the shared resource. As such, each Shared Resource (R) of a computing environment can be "passed" an EA to effectively protect the shared resource; this is depicted as R( . . . , EA). Typically, a particular Shared Resource (e.g., $R_1$) is protected by an EA (e.g., $EA_1$). However, an EA may be used to protect multiple resources, and can be passed as a resource parameter from one layer to another in a multi-layered software architecture. In general, multiple EAs ($EA_1$ . . . $EA_n$) may effectively protect multiple Shared Resource ($R_1$ . . . $R_n$).

Figure 8B:
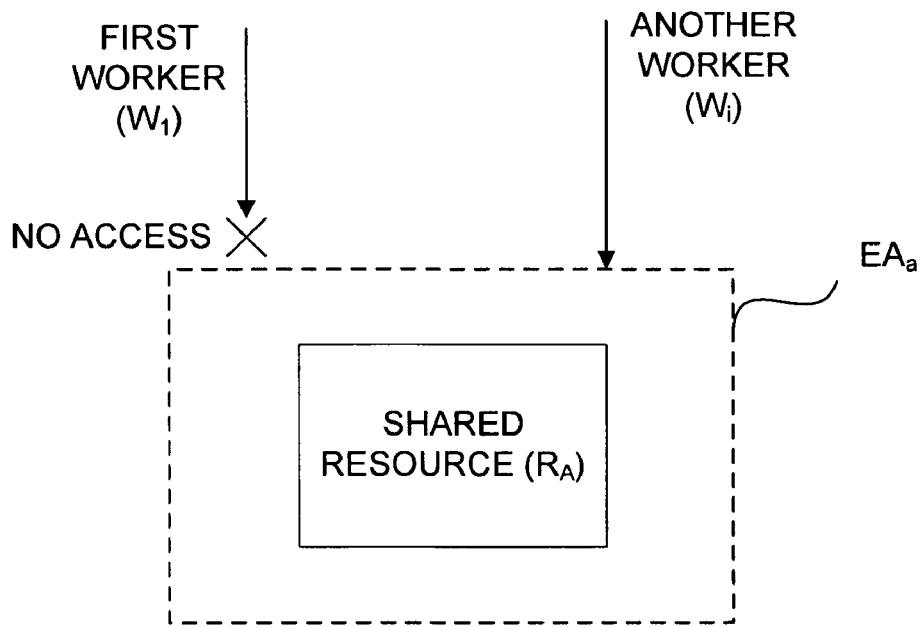
FIG. 8B depicts the interaction of Workers and Exclusion Areas (EAs) used to protect shared resources in a multi-threaded computing environment in accordance with one embodiment of the invention.

FIG. 8B depicts the interaction of Workers and Exclusion Areas (EAs) used to protect shared resources in a multi-threaded computing environment. Referring to FIG. 8B, conceptually, a first Worker $W_1$ (or execution context provided for a first thread of execution) can attempt to "visit" (or enter) an $EA_a$ protecting a first share resource $R_a$. In other words, a thread of execution can effectively try to access the first shared resource ($R_a$) protected by a logical lock $EA_a$. Generally, if an EA (e.g., $EA_a$) is already being visited by a Worker (e.g., $W_j$), then a first Worker W1 is prevented from visiting that EA (e.g., $EA_a$). In other words, the execution context for a thread would not be able to enter the logical exclusion (EA) protecting a shared resource, if the execution context of another thread (another Worker) is accessing the shared resource. This situation is depicted in FIG. 8B where a first Worker ($W_i$) cannot visit the $EA_a$ protecting the first shared resource $R_a$ because another Worker ($W_j$) is visiting the $EA_a$ and is effectively accessing or using the first shared resource ($R_a$).

Figure 8C:
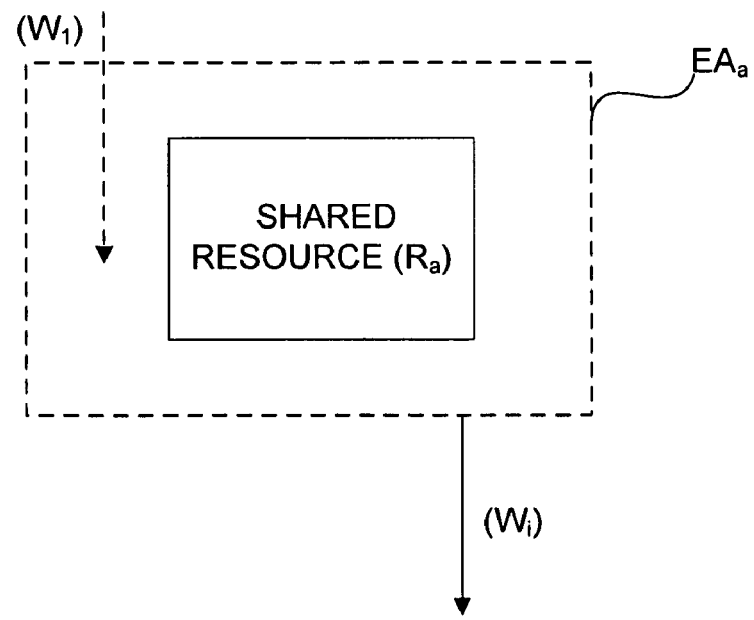
FIG. 8C depicts the interaction of Workers and Exclusion Area (EAs) used to protect shared resources in a multi-threaded computing environment in accordance with one embodiment of the invention.

FIG. 8C depicts the Worker $W_1$ visiting (or entering) the $EA_a$ after the other Worker ($W_j$) has exited the EA. It should be noted that while a Worker (e.g., $W_1$) is visiting an EA (e.g., $EA_a$), it may try to visit another EA protecting a different shared resource. For example, while visiting $EA_a$, Worker $W_1$ can try to visit a second EA ($EA_b$) protecting a second shared resource ($R_b$). In accordance with another aspect of the invention, a Worker may effectively visit multiple EAs and therefore multiple shared resources. In one embodiment, a numbering (or priority scheme) can be effectively used to determine whether a Worker can visit multiple EAs. It will be appreciated that the numbering scheme can also resolve deadlocks between multiple threads.

Figure 9A:
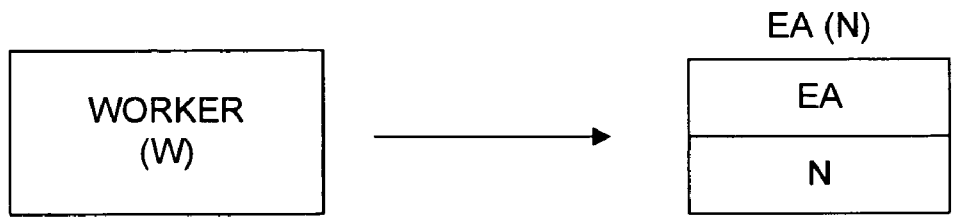
FIG. 9A, an EA is implemented with a number (e.g., level, priority) N.
Figure 9B:
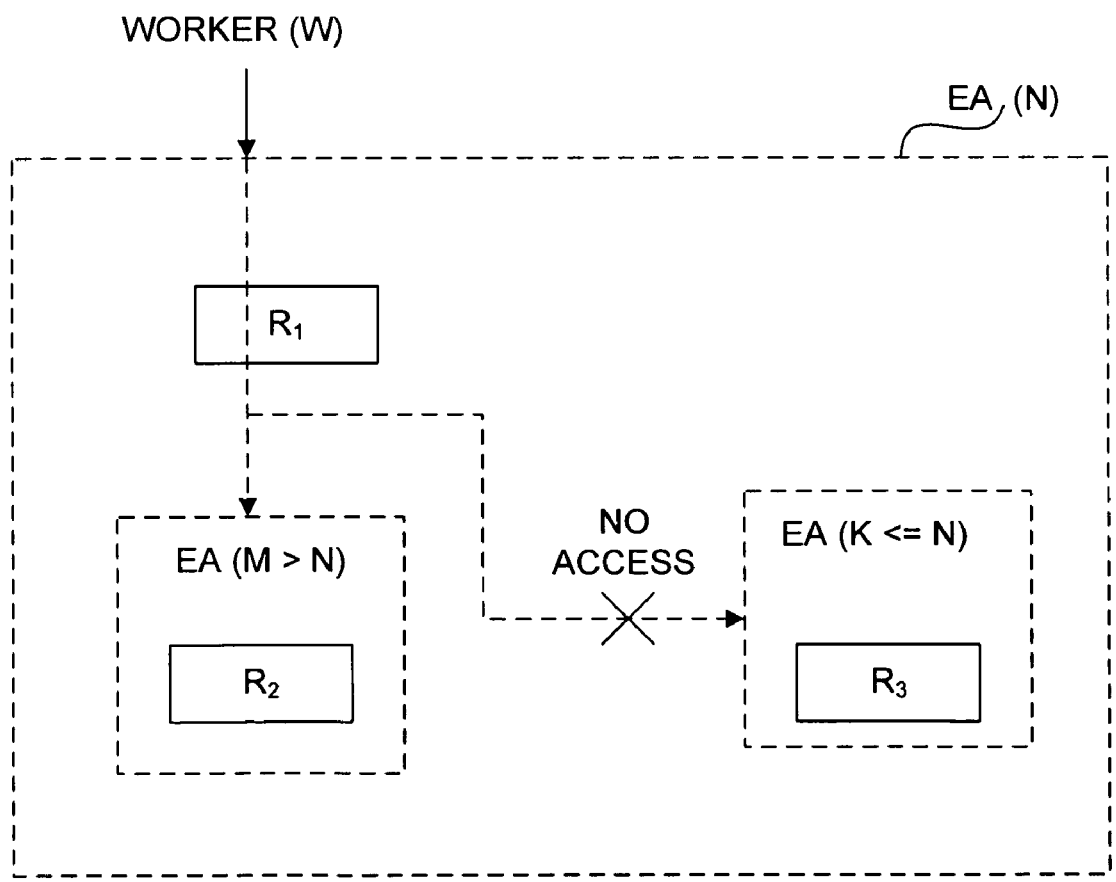
FIG. 9B, Worker $W_1$ is depicted while visiting an $EA_{(N)}$ (e.g., $EA_{(3)}$).

Referring to FIG. 9A, an EA is associated with a number (e.g., level, priority) N. Those skilled in the art will appreciate that this can, for example, be accomplished by an EA with a property or parameter N (EA.Number). As such, each EA protecting a shared resource can be assigned a Number (e.g., 1, 2, 3, 4, 5). This number can be used to determine whether a Worker can visit multiple EAs. Referring now to FIG. 9B, Worker $W_1$ is depicted while visiting an $EA_{(N)}$ (e.g., $EA_{(3)}$). In this situation, the Worker may visit EAs that are, for example, assigned numbers that are higher than N (e.g., 4 and $5 \geq 3$). However, the Worker $W_1$ would not be able to visit an EA with assigned numbers that are lower than or equal to N($k \leq N$).

Figure 10:
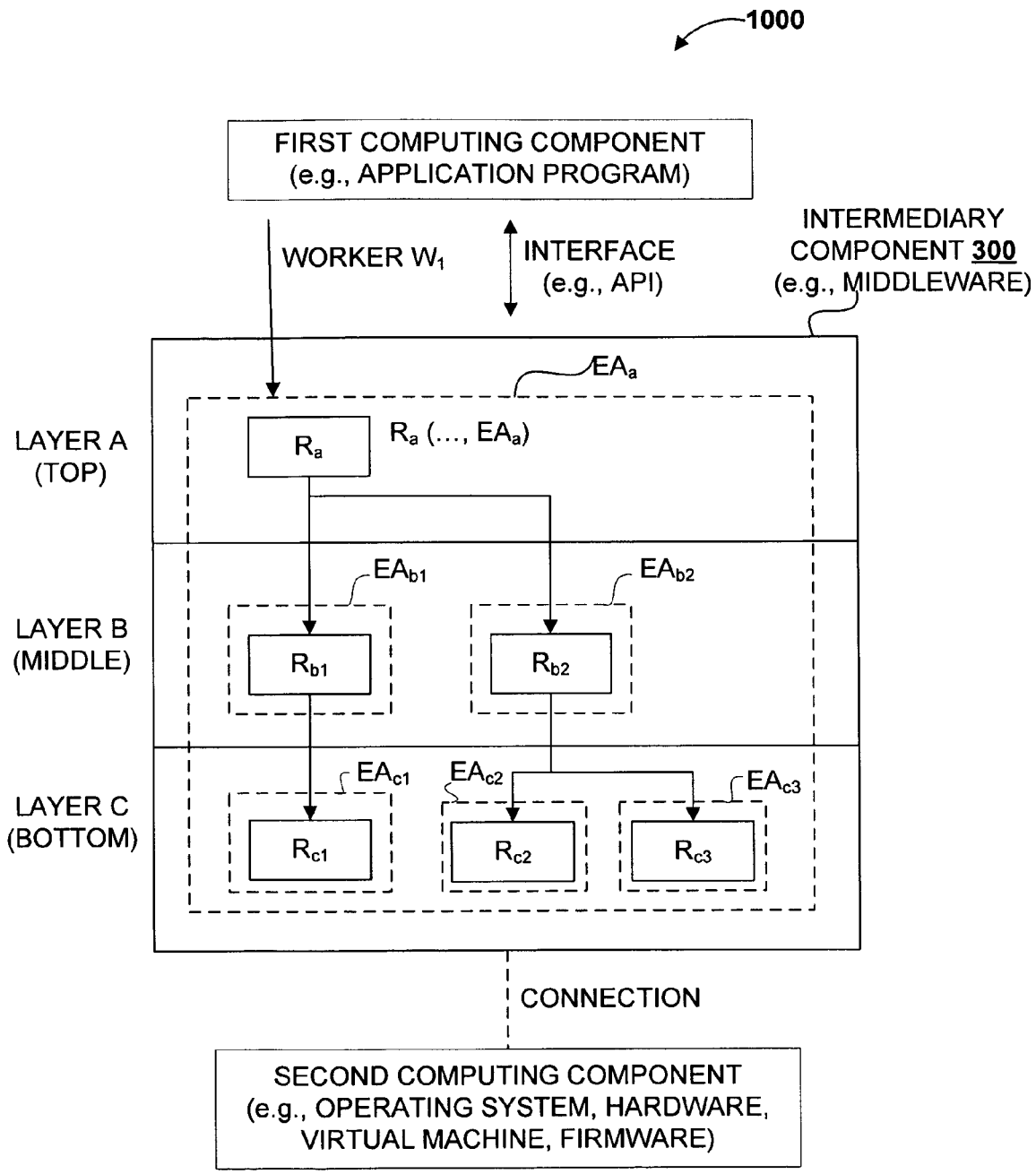
FIG. 10 depicts a computing environment that uses the intermediary component (e.g., middleware) as an intermediary component between a first and second computing components.

Those skilled in the art will appreciate that similar to the conceptual notion of a Worker, the notion of an Exclusion Area can be used in a multilayered programming environment. FIG. 10 depicts a computing environment 1000 that uses the intermediary component (e.g., middleware) 300 (also shown in FIG. 3) as an intermediary component between a first and second computing components. The intermediary component 300 is implemented in multiple layers where a shared resource ($R_a$) in layer A is protected by $EA_a$, and is parametrically depicted as $R_a$( . . . , $EA_a$). Similarly, shared resources $R_{b1}$ and $R_{b2}$ can be in a middle layer B, and so on. Each of the shared resources can be effectively protected by an Exclusion Area (EA) as depicted in FIG. 10, and parametrically depicted as R( . . . , EA). It will be appreciated that a Worker $W_1$ can visit the $EA_a$ at the top layer A, if no other Worker is visiting the $EA_a$, as discussed above. Moreover, the Worker $W_1$ can visit EAs in a lower layers ($EA_{b1}$, $EA_{b2}$) and the one lower than that ($EA_{c1}$, $EA_{c2}$, $EA_{c3}$), and so on. The $EA_a$ may be passed down to the lower layers as a parameter, as the thread effectively accesses resources. Thus, multiple resources in a lower layer, which are protected by distinct EAs, can be mapped to a single EA passed down as a parameter from a higher layer. Thus, a single physical lock associated with $EA_a$ may actually be used to protect all of the resources that are effectively used by the thread as the Worker visits the EAs.

It should be noted that the determination of whether the Worker can visit multiple EAs can be made, for example, based on a numbering (or prioritizing) scheme used for the EAs, and thereby their respective shared resources. As such, multiple EAs can be organized so that only a single physical lock is taken by a Worker $W_1$, thus, the thread associated with the Worker $W_1$ can effectively use a single physical lock to access multiple shared resources. This allows a "desired" binding of shared resources to physical exclusion locks, thereby allowing users to control the amount of resource contention that can be tolerated in the system as desired.

Figure 11:
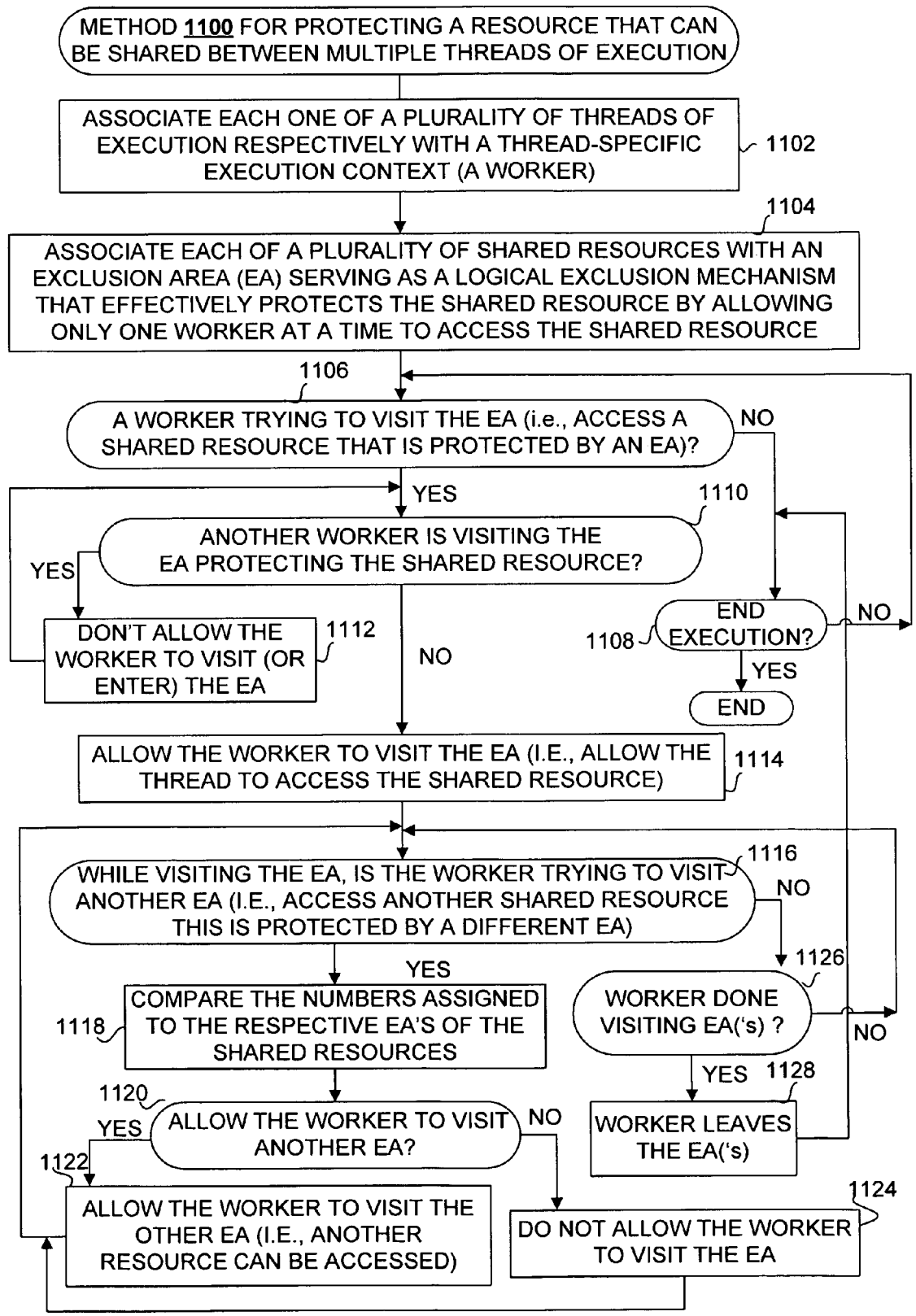
FIG. 11 depicts a method for protecting a resource that can be shared between multiple threads of execution in accordance with one embodiment of the invention.

FIG. 11 depicts a method 1100 for protecting a resource that can be shared between multiple threads of execution in accordance with one embodiment of the invention. The method 1100 is illustrated with respect to execution of a thread. However, those skilled in the art will appreciate that multiple threads can effectively use the method 1100. Initially, each one of a plurality of threads of execution are respectively associated (1102) with a thread-specific execution context (a Worker). In addition, each of a plurality of shared resources are associated (1104) with an Exclusion Area (EA) serving as a logical exclusion mechanism that effectively protects the shared resource. Generally, an EA protects the shared resource by allowing only one Worker to access the shared resource at a given time. Next, it is determined (1106) whether a Worker is trying to visit an EA. In other words, it is determined (1106) whether the thread associated with the Worker is trying to access a shared resource effectively protected by an Exclusion Area (EA). If it is determined (1106) that the Worker is not trying to access a shared resource, and it is determined (1108) to end execution, the method 1100 ends.

However, if it is determined (1106) that the Worker is trying to visit the EA, it is determined (1110) whether another Worker is visiting the EA that is protecting the shared resource. In effect, it is determined whether another context of execution is accessing the shared resource. Accordingly, if it is determined (1110) that another Worker is visiting the EA, the Worker is not allowed (1112) to visit (or enter) the EA. In effect, the thread associated with the Worker is caused to wait to access the shared resource.

On the other hand, if it is determined that another Worker is not visiting the EA, the Worker is allowed (1114) to visit the EA, thereby allowing the thread associated with the Worker to access the shared resource. Thereafter, it is determined (1116) whether the Worker is trying to access another shared resource protected by a different EA while the Worker is visiting the EA. In other words, it is determined (1116) whether the Worker is attempting to visit another EA effectively protecting a second shared resource while the Worker is still visiting the EA protecting the first shared resource. If it is determined (1116) that the Worker is trying to visit another EA while visiting the EA, the numbers assigned to each of the EAs can be compared (1118). Accordingly, based on the comparison of the numbers assigned to each EA, it can be determined (1120) whether to allow the Worker to visit another EA. Thus, the Worker may be allowed (1122) to visit the other EA (i.e., access a second shared resource) or the Worker may not be allowed (1124) to visit the EA, thereby preventing the associated thread from accessing a second shared resource. In effect, the Worker may attempt to visit (or enter) several EAs and permission to enter can be granted or denied in a similar manner as discussed above. It should be noted that if it is determined (1116) that the Worker is not trying to visit another EA, it is determined (1126) whether the Worker is to leave the one or more EAs it has visited. Accordingly, the Worker can leave the one or more EAs and the execution method 1100 can end. The execution method 1100 ends when it is determined (1108) to end the execution of a thread or threads.

Conventional, resource contention is typically resolved by protecting shared resources by mutual exclusion semaphores. An EA provides a logical abstraction of the notion of a mutual exclusion semaphore. An EA can be associated with a layer in a multilayered architecture. Each shared resource can be passed an EA that will be used to protect it. The same EA can be used to protect another resource; multiple EAs may be used to protect different resources. The decision of how many EAs to use and the binding of EAs to physical locks can be made in higher layers, and can be configurable by the user. This approach allows the user to tune the amount of resource contention in the system. Conceptually, an EA may be visited by a Worker. A worker may be visiting zero, one, or more EA at any given time. The Worker and EA keep track of each other. A Worker can only enter an EA if its level is higher than the level of the EA (if any) the Worker is in currently. This approach prevents deadlocks, by avoiding a situation where a worker is effectively waiting on itself.

There are situations where the worker mechanism can be combined with the EA mechanism. For example, when there are common shared resources that need to be accessed by multiple execution contexts or workers. As such, the Exclusion Area (EA) mechanism can work in conjunction with the worker mechanism to address resource sharing among workers. In one embodiment, An Exclusion Area (EA) is a logical abstraction with the following properties.

An EA is associated with a number (its "level"). EAs are ordered by this number.

An EA can only be visited by one worker at a time. A worker can "enter" the EA, do its work which might typically involve using a shared resource, and finally when it is done, "leave" the EA.

A worker can visit many EAs. A worker is allowed to enter an EA only if that EAs ordering with respect to the other EAs the worker is currently visiting allows it.

A worker can re-enter an EA many times. Each entry of a Worker into an EA must be balanced by the Worker leaving the EA. Only after a Worker has left an EA as many times as it entered it, the Worker is considered to be no longer visiting the EA.

Figure 13:
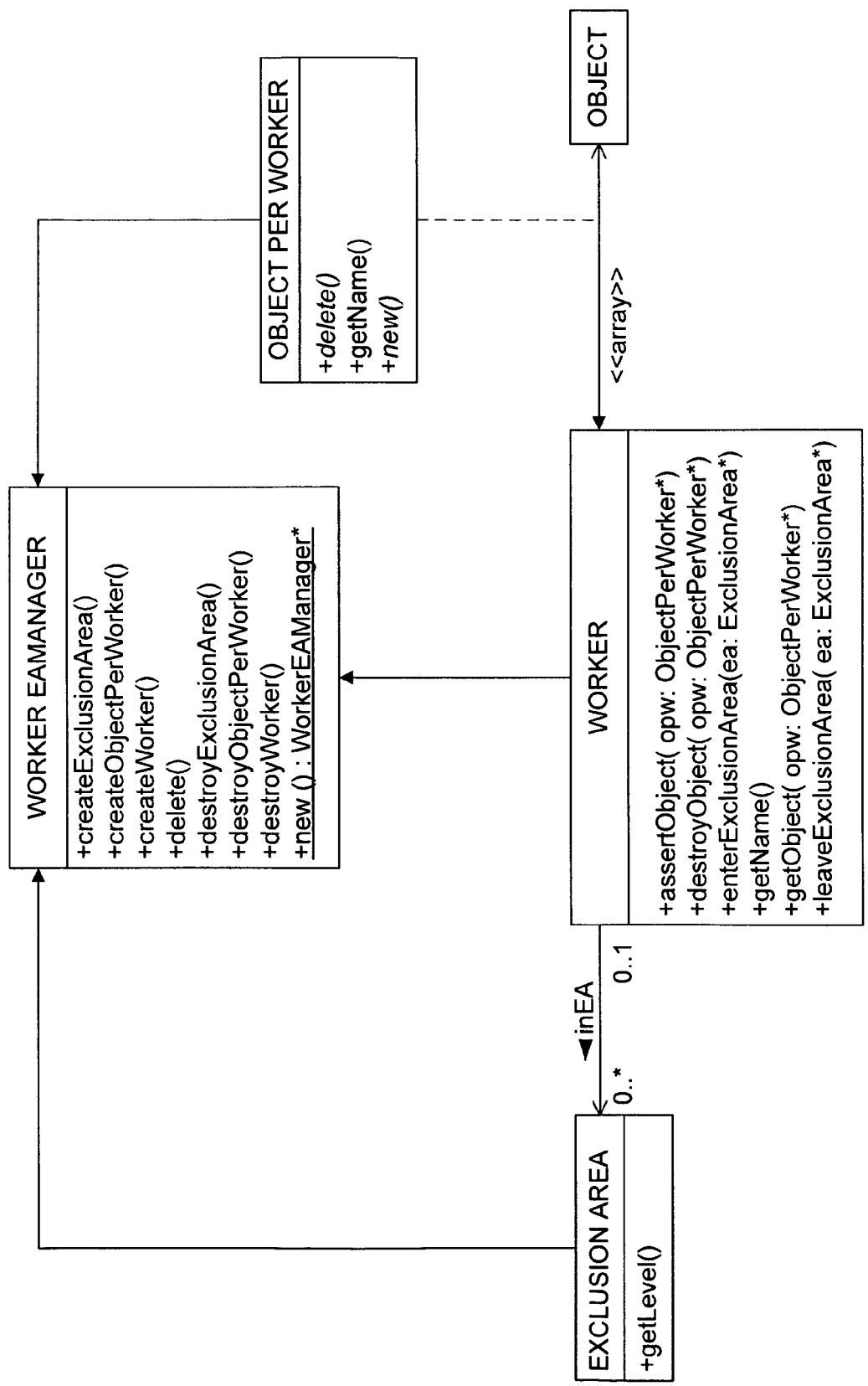
FIG. 13 shows a Unified Modeling Language (UML) class diagram from an actual implementation of the Worker and EA mechanisms in accordance with one embodiment of the invention.
Figure 14:
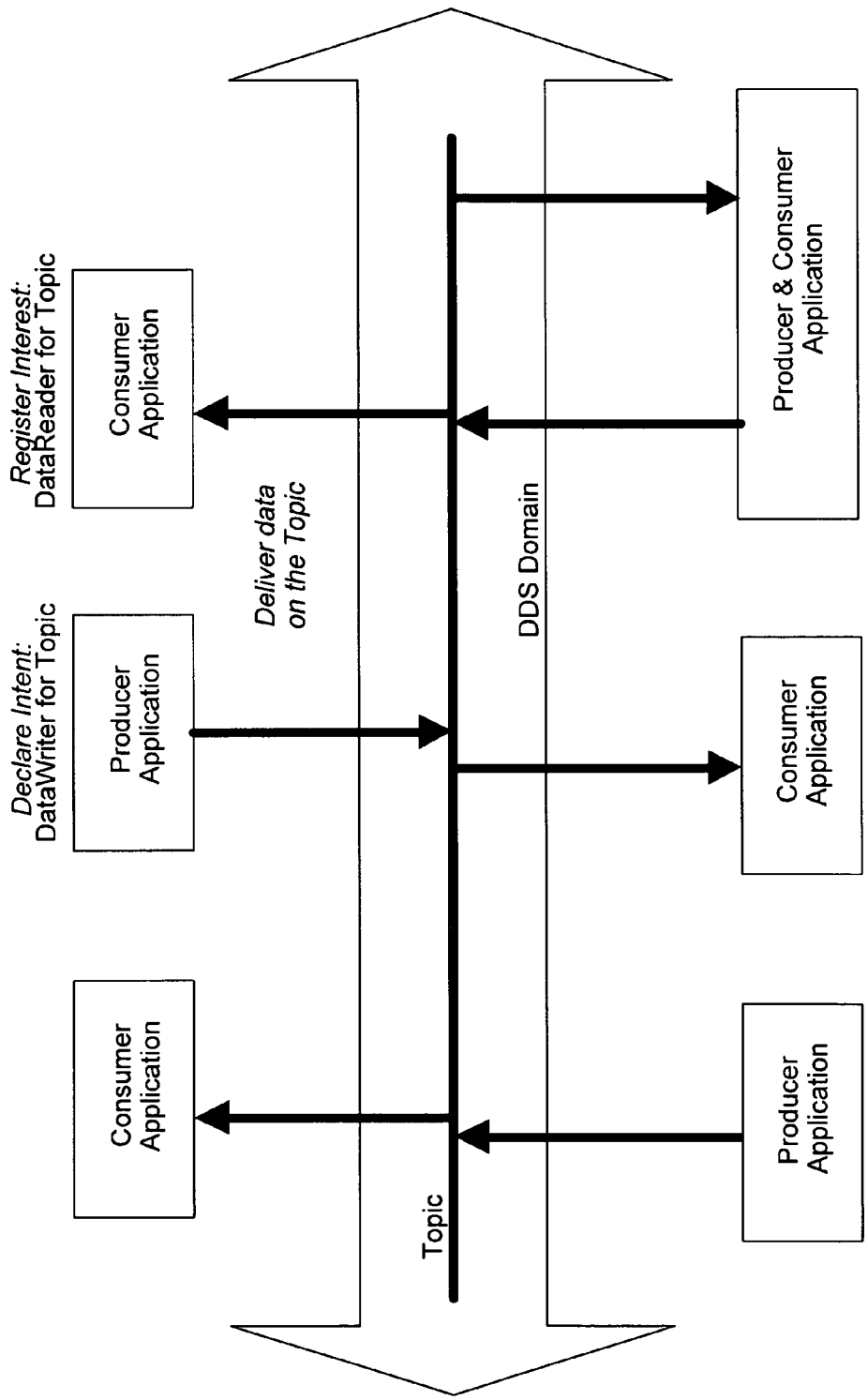
FIG. 14 depicts a data distribution middleware that decouples producers and consumers of Data in a domain.

FIG. 13 shows a Unified Modeling language (UML) class diagram from an actual implementation of the Worker and EA mechanisms in accordance with one embodiment of the invention. A WorkerFactory is used to create EA objects. A Worker can enter or leave an EA, and can be simultaneously visiting multiple EAs. However, an EA can be visited by one and only one Worker at a time. An EA keeps track of the Worker visiting it, while a Worker keeps track of the EAs it is visiting. An EA is associated with a level, which cannot be changed after an EA has been created. A Worker can only enter EAs if its level is higher than the levels of the EAs it is currently visiting, provided that there is no other Worker visiting the EA. A Worker can revisit an EA it is already visiting by re-entering it; a re-entry must be balanced by the Worker leaving the EA. Another Worker cannot enter the EA until the Worker already visiting the EA, leaves the EA as many times as it entered it.

As noted above, deadlock conditions between Workers trying to access Exclusion Areas (EAs) can be resolved by assigning a number (e.g., level priority) in accordance with one aspect of the invention. By way of example, a deadlock condition would arise when a first Worker enters a first EA and waits for a second EA at the same time when a second Worker enters the second EA and waits for the first EA. This deadlock condition is resolved by assigning a number (e.g., level priority) to the first and second EAs.

In another aspect, a Worker provides a programming context that represents a logical thread. The Worker can, for example, be passed explicitly as a parameter in the call chain up and down the stack. In another aspect, an Exclusion Area (EA) represents a programming construct that can, for example, be explicitly associated with a level. The EA can work hand in hand with a worker to provide the following functionality: (a) the Worker maintains a record of the Exclusion Areas (EAs) it has currently visited, and (b) the EA knows the Worker that is visiting it (if any) and the level, and the number of times it has been entered by the worker (repetitive_entry_counter). These two objects representative of the Worker and the EA can, for example, collaborate following these rules:

If a Worker tries to re-enter an EA it is already visiting, it is allowed to do so and the "repetitive_entry_counter" is incremented;

If the Worker tries to enter an EA it is not visiting, and the level of the EA is <=the maximal level of all the currently visited EAs by the worker, the operation fails;

Otherwise the enter operation succeeds, and acquires an underlying operating-system lock or a similar construct.

If a worker tries to leave an EA it is not currently visiting, the operation fails;

Otherwise the "repetitive_entry_counter" is decremented and in case it is zero (i.e. the Worker left the EA as many times as it was entered), the underlying operating system lock or similar construct is released.

Variations contemplate the case where the underlying OS resource handles the "repetitive_acquisition_count." In this case the EA has less to do but it provides the same service to the Worker.

The Workers and EA framework is applied to the construction of multi-layered real-time data middleware. For example, the DDS specification does not specify an implementation model. Instead it focuses on the logical model of data distribution for real-time systems. The combination of Workers and EA provides a flexible and general purpose mechanism for multi-threading and resource sharing that can be used to realize a high performance real-time data distribution middleware implementation. These techniques can be used to ensure minimal "end-to-end" latency and maximal concurrency in a system.

Figure 15:
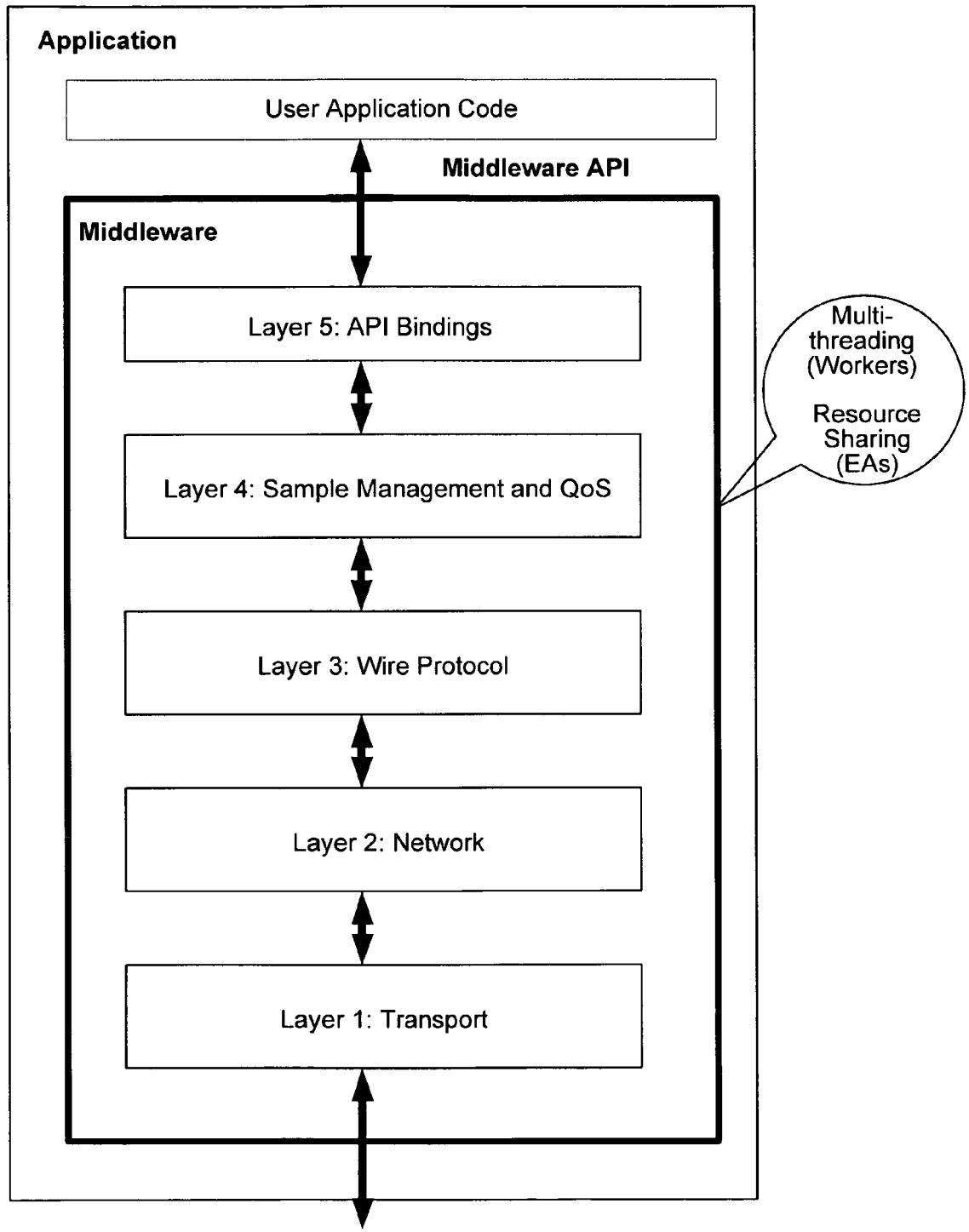
FIG. 15 depicts a layered data distribution middleware architecture in accordance with one embodiment of the invention.

FIG. 15 depicts a layered data distribution middleware architecture. The data distribution middleware is implemented in layers. These include a transport layer, network layer to manage the transports, a protocol layer to implement the handshaking protocol between different entities, a sample management and Quality of Service (QoS) layer to manage the outgoing and incoming data samples, and the API binding layer that expose the middleware implementation by means of the DDS API to the User Application Code. Each layer has a well-defined public interface, used by the layers that build on top of it. Resources may be shared across layers, and threads may cut across multiple layers. Thus layers cannot independently do their own threading and resource sharing without impacting one another.

In one embodiment, Workers are associated with individual threads that interact with the data distribution middleware. At the top layer of a data distribution middleware there are user-threads. At the bottom layer of the data distribution middleware there are "receive-threads" that are waiting for incoming messages on transport plugin resources, and storing the information in the internal middleware buffers. Other layers in the data distribution middleware may create and use internal threads to implement the functionality offered by the middleware.

Figure 17A:
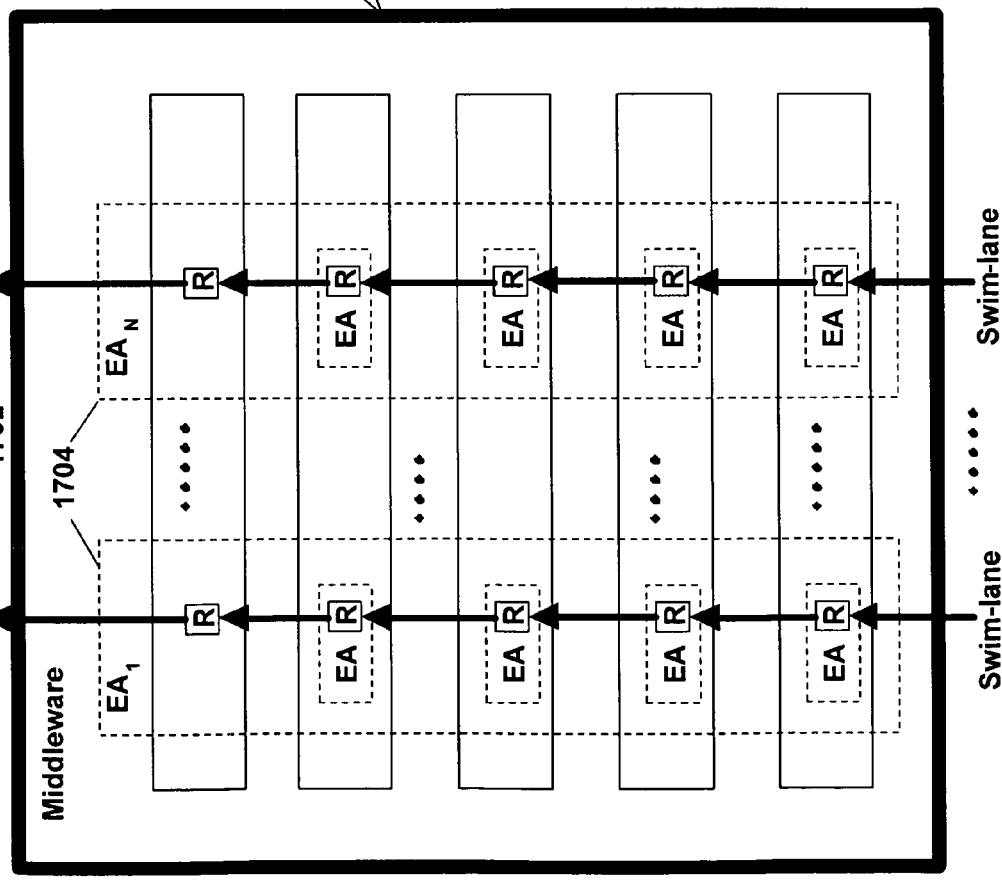
FIG. 17A illustrates that the EAs in the incoming data path for a single Data Reader can be mapped across the middleware layers to a single logical EA at the top layer, which can be bound to a single physical lock per Data Reader.
Figure 17B:
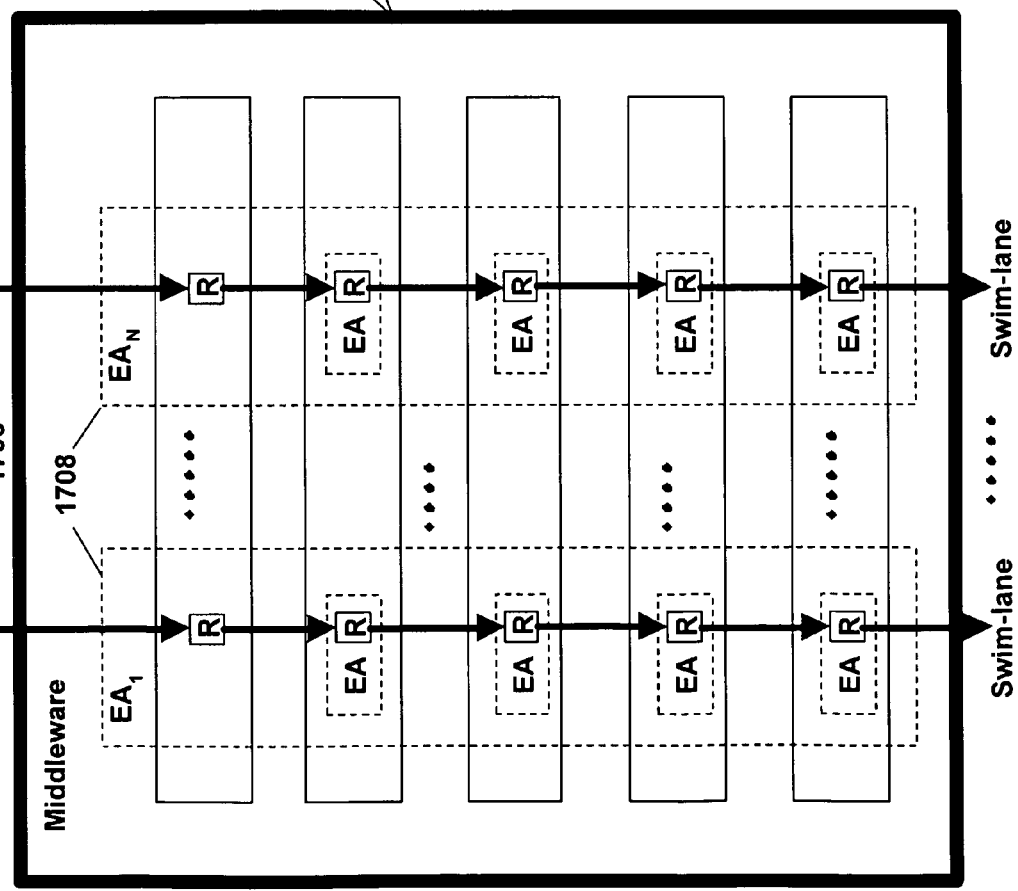
FIG. 17B illustrates that the EAs in the outgoing data path for a single Data Writer can be mapped across the middleware layers to a single logical EA at the top layer, which can be bound to a single physical lock per Data Writer.

Further, different middleware layers can be configured to use the same Exclusion Area (EA) to protect all the internal shared resources that are visited in connection with writing data for a single Data Writer or receiving data from a single Data-Reader. The internal shared resources necessary to write (or read) a different Data Writer or Data Reader can also be effectively protected; it is typically protected with a different EA. Those skilled in the art will appreciate that the same EA can be used for the resources associated with a single Data Writer or Data Reader entity across the layers of the middleware. This is illustrated in FIG. 17A for Data Readers and FIG. 17B for Data Writers. FIG. 17A illustrates that the EAs in the incoming data path for a single Data Reader 1702 can be mapped across the middleware layers to a single logical EA 1704 at the top layer, which can be bound to a single physical lock per Data Reader 1702. FIG. 17B illustrates that the EAs in the outgoing data path for a single Data Writer 1706 can be mapped across the middleware layers to a single logical EA 1706 at the top layer, which can be bound to a single physical lock per Data Writer 1706. Each Data Reader 1702 (Data Writer 1706) entity is associated with a different Exclusion Area (EA). The EAs protecting the shared resources used by the Data Reader 1702 (Data Writer 1706) in the internal middleware layers are mapped across the layers such that for a Data Reader 1702 (Data Writer 1706) the incoming (outgoing) data path effectively uses a single physical lock. Furthermore, the incoming (outgoing) data paths of Data Readers 1702 (Data Writers 1706) are independent of each other and can deliver data concurrently in parallel threads of execution. This in effect creates what can be depicted as a latency "swim-lane" whereby incoming messages intended for a Data Reader can proceed up the Data Reader's swim-lane 1704 in parallel (concurrently) with incoming messages intended for another Data Reader. Similarly, for Data Writers, outgoing messages can proceed down the Data Writer's swim-lane 1708 in parallel (concurrently) with other Data Writers. Since the Data Readers and Data Writers use different EAs, the middleware can concurrently send and receive data. Also since the EAs in a data path are mapped across layers there is no need to take multiple locks, thus minimizing the latency in the data path.

Figure 17C:
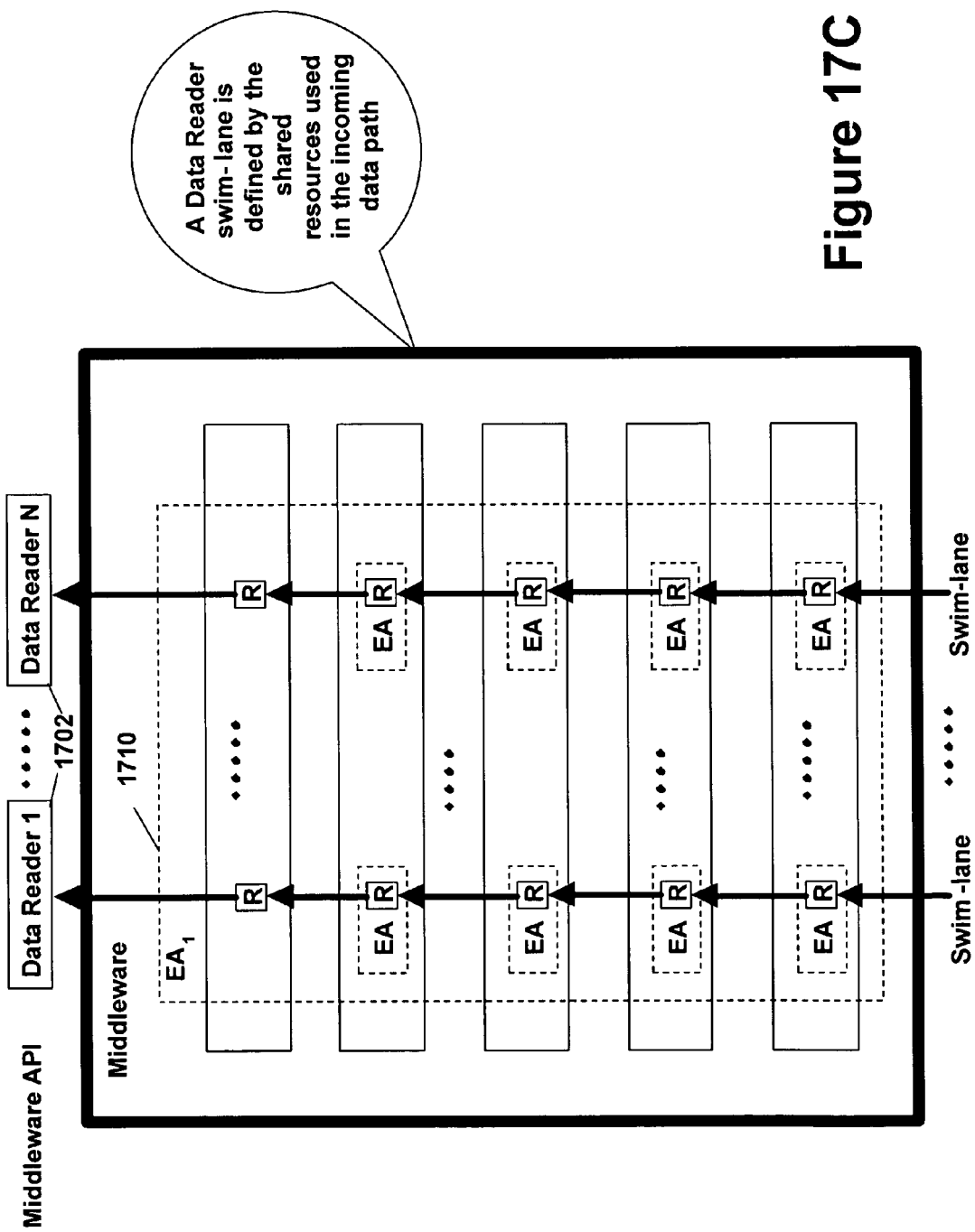
FIG. 17C illustrates that the EAs in the incoming data path for a group of Data Readers (say belonging to a Subscriber) can be mapped across the middleware layers to a single logical EA at the top layer, which can be bound to a single physical lock per group of Data Readers (Subscriber).
Figure 17D:
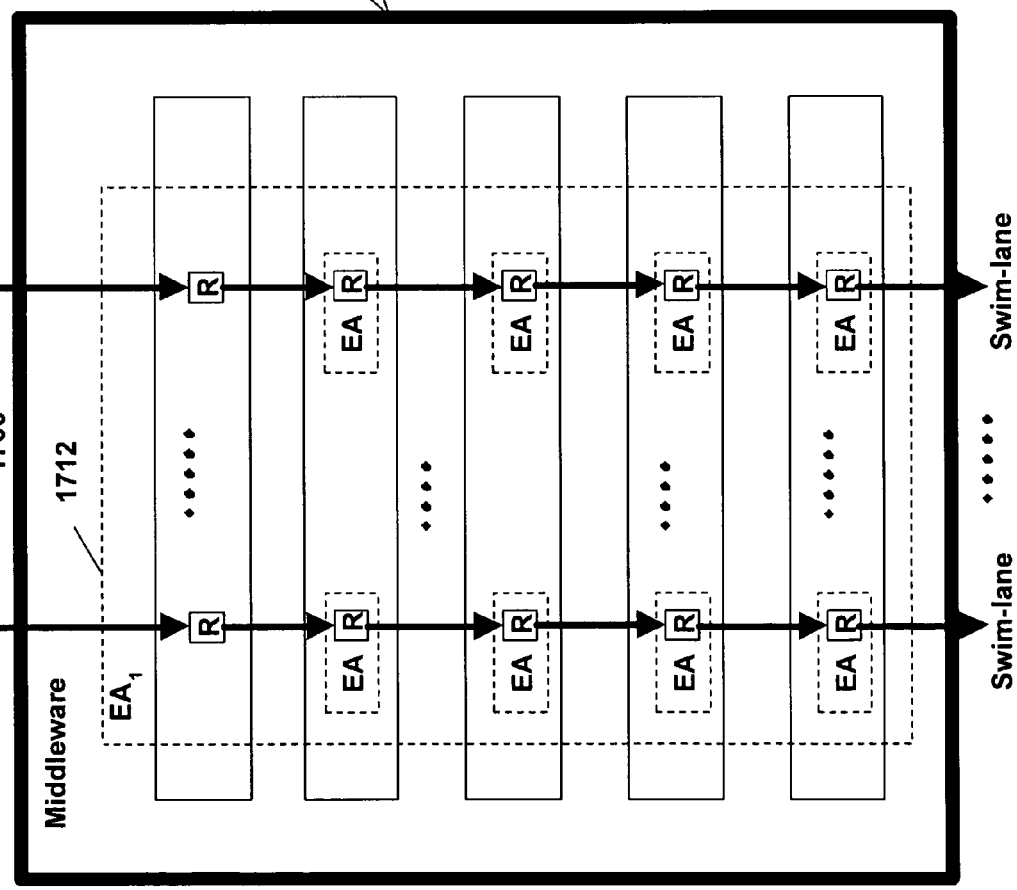
FIG. 17D illustrates that the EAs in the outgoing data path for a group of Data Writers (say belonging to a Publisher) can be mapped across the middleware layers to a single logical EA at the top layer, which can be bound to a single physical lock per group of Data Writers (Publisher).

It should also be noted that groups of Data Reader (or Data Writer) entities can be made to use the same Exclusion Area (EA), in effect, making the write or read exclusive from each other (i.e. it is no longer possible to use Data Writer 1 and Data Writer 2 concurrently from different user-threads). The EAs protecting resources in a data path across the different layers can be mapped to a single logical EA for a group of Data Readers (Data Writers), based on a user specified configuration policy. The single EA per group of Data Readers (Data Writers) can in turn be bound to a single physical lock. This is illustrated in FIG. 17C for a group of Data Readers, and in FIG. 17D for a group of Data Writers. FIG. 17C illustrates that the EAs in the incoming data path for a group of Data Readers (say belonging to a Subscriber) can be mapped across the middleware layers to a single logical EA 1712 at the top layer, which can be bound to a single physical lock per group of Data Readers (Subscriber). FIG. 17D illustrates that the EAs in the outgoing data path for a group of Data Writers (say belonging to a Publisher) can be mapped across the middleware layers to a single logical EA 1712 at the top layer, which can be bound to a single physical lock per group of Data Writers (Publisher). In one embodiment, a single EA is associated with a Subscriber (for the group of Data Readers created from the Subscriber) and a single EA is associated with a Publisher (for the group of Data Writers created from the Publisher).

The selection of whether to use a single physical lock per Data Reader (Data Writer) or whether to use a single lock per Data Reader (Data Writer) group such as a Subscriber (Publisher) can be made by a user configurable policy, that can be specified in the user application code (FIG. 15).

Those skilled in the art will appreciate that the invention can be used to allow the layers to be developed independently without making assumptions about the threads being used or the resource sharing scheme being used. Instead, the techniques discussed in the invention delay the resource locking and the thread assignment until the very top layers. The techniques also enable a flexible remapping to alternate resource sharing and threading schemes without changing existing code.

The invention has many advantages. One or more embodiments of the invention can provide one or more of the advantages highlighted below.

Passing a worker parameter to each method, so that it has access to all the contextual state in a platform independent manner.

Delayed binding of workers to threads until later enables the implementation to be effectively mapped to single or multithreaded environment.

Associating each shared resource with an EA, and delaying the actual binding of the EAs to physical locks until later, thus controlling the amount of resource contention that can be tolerated in the system.

Decoupling the implementation from physical constrains of the deployment environment: assumptions about the number of threads, or the physical locks (EAs) need not be made in the implementation. It can just implement the most efficient algorithms.

Enables the implementation of real-time middleware in a manner that allows the concurrency and resource contention to be user configurable "quality of service" policies.

Figure 16A:
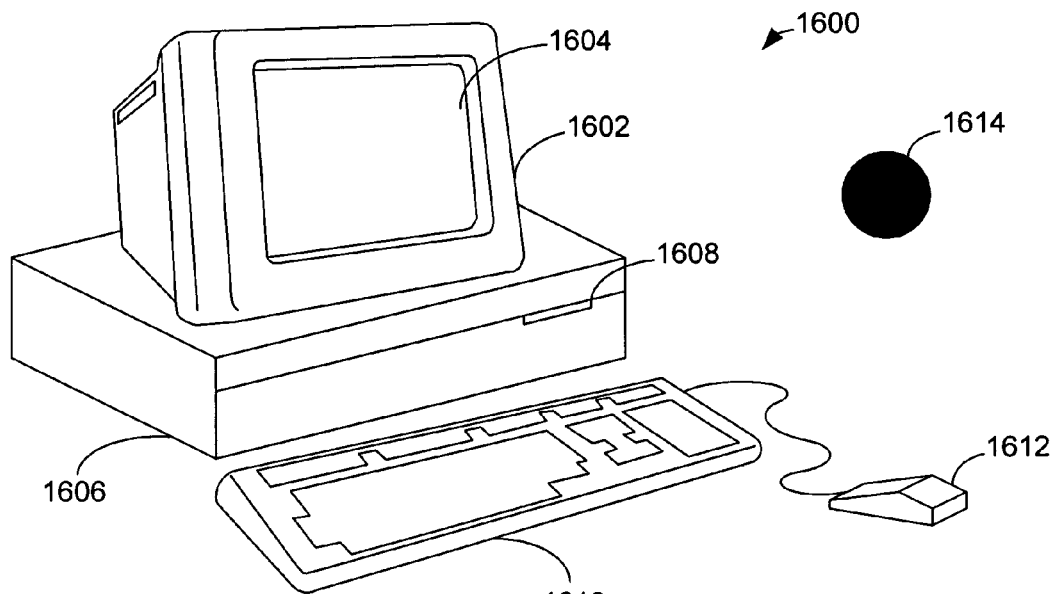
FIGS. 16A-B illustrate a computer system suitable for implementing the embodiments of the present invention.
Figure 16B:
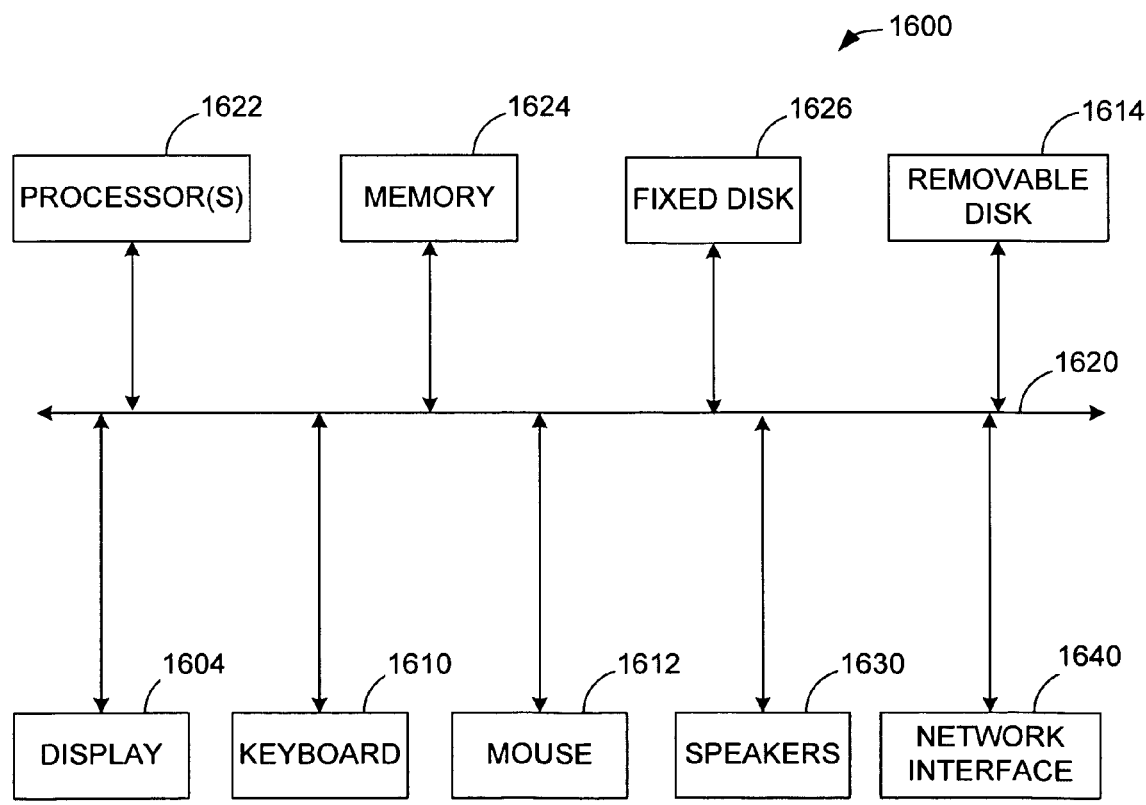

FIGS. 16A and 16B illustrate a computer system 1600, which is suitable for implementing embodiments of the present invention. FIG. 16A shows one possible physical form of the computer system. Of course, the computer system may have many physical forms ranging from an integrated circuit, a printed circuit board, and a small handheld device up to a huge super computer. Computer system 1600 includes a monitor 1602, a display 1604, a housing 1606, a disk drive 1608, a keyboard 1610, and a mouse 1612. Disk 1614 is a computer-readable medium used to transfer data to and from computer system 1600.

FIG. 16B is an example of a block diagram for computer system 1600. Attached to system bus 1620 is a wide variety of subsystems. Processor(s) 1622 (also referred to as central processing units, or CPUs) are coupled to storage devices, including memory 1624. Memory 1624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any of the suitable computer-readable media described below. A fixed disk 1626 is also coupled bi-directionally to CPU 1622; it provides additional data storage capacity and may also include any of the computer-readable media described below. Fixed disk 1626 may be used to store programs, data, and the like and is typically a secondary storage medium (such as a hard disk) that is slower than primary storage. It will be appreciated that the information retained within fixed disk 1626 may, in appropriate cases, be incorporated in standard fashion as virtual memory in memory 1624. Removable disk 1614 may take the form of any of the computer-readable media described below.

CPU 1622 is also coupled to a variety of input/output devices, such as display 1604, keyboard 1610, mouse 1612, and speakers 1630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1622 optionally may be coupled to another computer or telecommunications network using network interface 1640. With such a network interface, it is contemplated that the CPU might receive information from the network, or might output information to the network in the course of performing the above-described method steps. Furthermore, method embodiments of the present invention may execute solely upon CPU 1622 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

What is claimed is:

1. A method of protecting a shared resource in a multi-threaded computing environments where multiple threads of execution (threads) can access said shared resource, said method comprising:

associating a first thread of execution (first thread) with a first thread-specific execution context (first Worker) that can effectively provide the execution context for executing operational computer code for said first thread when said first thread effectively activates said operational code for execution;

associating a first shared resource with a first Exclusion Area (first EA) provided as logical lock to effectively protect said first shared resource from multiple threads that may try to access said shared resource at the same time;

determining whether said first Worker associated with said first thread is trying to visit (or enter) said first Exclusion Area (first EA), thereby determining whether said first thread is attempting to access said first shared resource effectively protected by said first Exclusion Area (first EA);

determining whether said first Exclusion Area (first EA) is being visited by another Worker associated with another thread when said determining determines that said first Worker is trying to visit said first Exclusion Area (first EA); and not allowing said first Worker to visit said first Exclusion Area (first EA) when said determining determines that said first Exclusion Area (first EA) is being visited by said another Worker, thereby effectively preventing said first thread from accessing said first shared resource when said first shared resource is being accessed by said another thread.

2. A method as recited in 1, wherein said method further comprises: allowing said first Worker to visit said first Exclusion Area (first EA) when said determining determines that said first Exclusion Area (first EA) is not being visited by said another Worker, thereby effectively allowing said first thread to access said first shared resource when said first shared resource is not being accessed by said another thread.

3. A method as recited in claim 2, wherein said method further comprises: allowing said Worker to re-visit said first Exclusion Area (EA) that it has previously entered.

4. A method as recited in claim 3, wherein the Worker is considered to be visiting if it has entered an EA more times then it has left the EA.

5. A method as recited in claim 2, wherein said method further comprises:
   assigning a first number to said first Exclusion Area (first EA) that effectively protects said first shared resource;
   assigning a second number to a second Exclusion Area (second EA) that effectively protects a second shared resource;
   determining whether said first Worker is trying to visit said second Exclusion Area (second EA) when said first Worker is visiting said first Exclusion Area (first EA);
   comparing said first and second numbers when said determining determines that said first Worker is trying to visit said second Exclusion Area (second EA); and
   determining, based on said comparing, whether to allow said first Worker to visit said second Exclusion Area (second EA).

6. A method as recited in claim 5, wherein said method further comprises:
   allowing said first Worker to visit said second Exclusion Area (second EA), thereby allowing said first thread to access both said first and second shared resources.

7. A method as recited in claim 6, wherein said first and second Exclusion Areas (EAs) are mapped to a single physical lock, thereby allowing said first and second shared resources to be effectively protected by said single physical lock.

8. A method as recited in claim 1, wherein said method further comprises:
   mapping a plurality of EAs to a single EA bounded to a single physical lock, thereby protecting a plurality of shared resources associated with plurality of EA's with said single physical lock.

9. A method as recited in claim 8, wherein said plurality of EA are associated with shared resources in a Data Reader's or Data Writers incoming or outgoing data paths across a plurality of software layers, thereby allowing said plurality of Data Readers or Data Writers to deliver data concurrently.

10. A method as recited in claim 9, wherein said method comprises:
    determining whether to use a single physical lock per each Data Reader or Data Writer or per group of Data Readers or Data Writers.

11. A method as recited in claim 10, wherein said determining of whether to use a single physical lock per each Data Reader or Data Writer or per group of Data Readers or Data Writers is made based on an application program code via a configuration policy.

12. A non-transitory computer readable medium storing computer program code executed by a processor for protecting a shared resource in a multithreaded computing environments where multiple threads of execution (threads) can access said shared resource, said computer readable medium comprising:
    computer program code for associating a first thread of execution (first thread) with a first thread-specific execution context (first Worker) that can effectively provide the execution context for executing operational computer code for said first thread when said first thread effectively activates said operational code for execution;
    computer program code for associating a first shared resource with a first Exclusion Area (first EA) provided as logical lock to effectively protect said first shared resource from multiple threads that may try to access said shared resource at the same time;
    computer program code for determining whether said first Worker associated with said first thread is trying to visit (or enter) said first Exclusion Area (first EA), thereby determining whether said first thread is attempting to access said first shared resource effectively protected by said first Exclusion Area (first EA);
    computer program code for determining whether said first Exclusion Area (first EA) is being visited by another Worker associated with another thread when said determining determines that said first Worker is trying to visit said first Exclusion Area (first EA); and
    computer program code for not allowing said first Worker to visit said first Exclusion Area (first EA) when said determining determines that said first Exclusion Area (first EA) is being visited by said another Worker, thereby effectively preventing said first thread form accessing said first shared resource when said first shared resource is being accessed by said another thread.

13. A computer system operable to perform the method recited in claim 1.

* * * * *